(12) United States Patent
Lillis et al.

(10) Patent No.: US 7,010,440 B1
(45) Date of Patent: Mar. 7, 2006

(54) METHOD AND A MEASURING CIRCUIT FOR DETERMINING TEMPERATURE FROM A PN JUNCTION TEMPERATURE SENSOR, AND A TEMPERATURE SENSING CIRCUIT COMPRISING THE MEASURING CIRCUIT AND A PN JUNCTION

(75) Inventors: Elizabeth A. Lillis, Westbury (IE); John A. Cleary, Fermoy (IE); Evaldo M. Miranda, Saratoga, CA (US)

(73) Assignee: Analog Devices, Inc., Norwood, MA (US)

( * ) Notice: Subject to any disclaimer, the term of this patent is extended or adjusted under 35 U.S.C. 154(b) by 234 days.

(21) Appl. No.: 10/721,608

(22) Filed: Nov. 25, 2003

(51) Int. Cl.
*G01K 7/00* (2006.01)

(52) U.S. Cl. .................... 702/65; 374/178; 327/512; 327/513; 702/130

(58) Field of Classification Search ................ 702/65, 702/130, 132, 133; 327/512, 513; 374/178
See application file for complete search history.

(56) References Cited

U.S. PATENT DOCUMENTS

| | | | |
|---|---|---|---|
| 5,195,827 A | | 3/1993 | Audy et al. |
| 6,008,685 A | * | 12/1999 | Kunst ........................ 327/512 |
| 6,019,508 A | * | 2/2000 | Lien ........................... 374/178 |
| 6,097,239 A | | 8/2000 | Miranda, Jr. et al. |
| 6,554,469 B1 | * | 4/2003 | Thomson et al. ........... 374/178 |
| 6,637,934 B1 | * | 10/2003 | Henderson et al. ......... 374/178 |
| 6,808,307 B1 | * | 10/2004 | Aslan et al. ................ 374/178 |
| 6,869,216 B1 | * | 3/2005 | Holloway et al. .......... 374/170 |
| 6,870,357 B1 | * | 3/2005 | Falik .......................... 324/71.5 |

* cited by examiner

*Primary Examiner*—Patrick J. Assouad
(74) *Attorney, Agent, or Firm*—Wolf, Greenfield & Sacks, P.C.

(57) ABSTRACT

A switched current temperature sensing circuit (1) comprises a measuring transistor (Q1) which is located remotely of a measuring circuit (5) which applies three excitation currents $(I_1, I_2, I_3)$ of different values to the measuring transistor (Q1) in a predetermined current sequence along lines (10,11). Resulting base/emitter voltages from the measuring transistor (Q1) are applied to the measuring circuit (5) along the same two lines (10,11) as the excitation currents are applied to the measuring transistor (Q1). Voltage differences $\Delta V_{be}$ of successive base/emitter voltages resulting from the excitation currents are integrated in an integrating circuit (36) of the measuring circuit (5) to provide an output voltage indicative of the temperature of the measuring transistor (Q1). By virtue of the fact that the measuring transistor (Q1) is excited by excitation currents of three different values, the effect of current path series resistance in the lines (10,11) on the output voltage indicative of temperature is eliminated. The predetermined current sequence in which the excitation currents are applied to the measuring transistor (Q1) is selected to minimize the voltages in the integrating circuit (36) during integration of the voltage differences $\Delta V_{be}$.

59 Claims, 8 Drawing Sheets

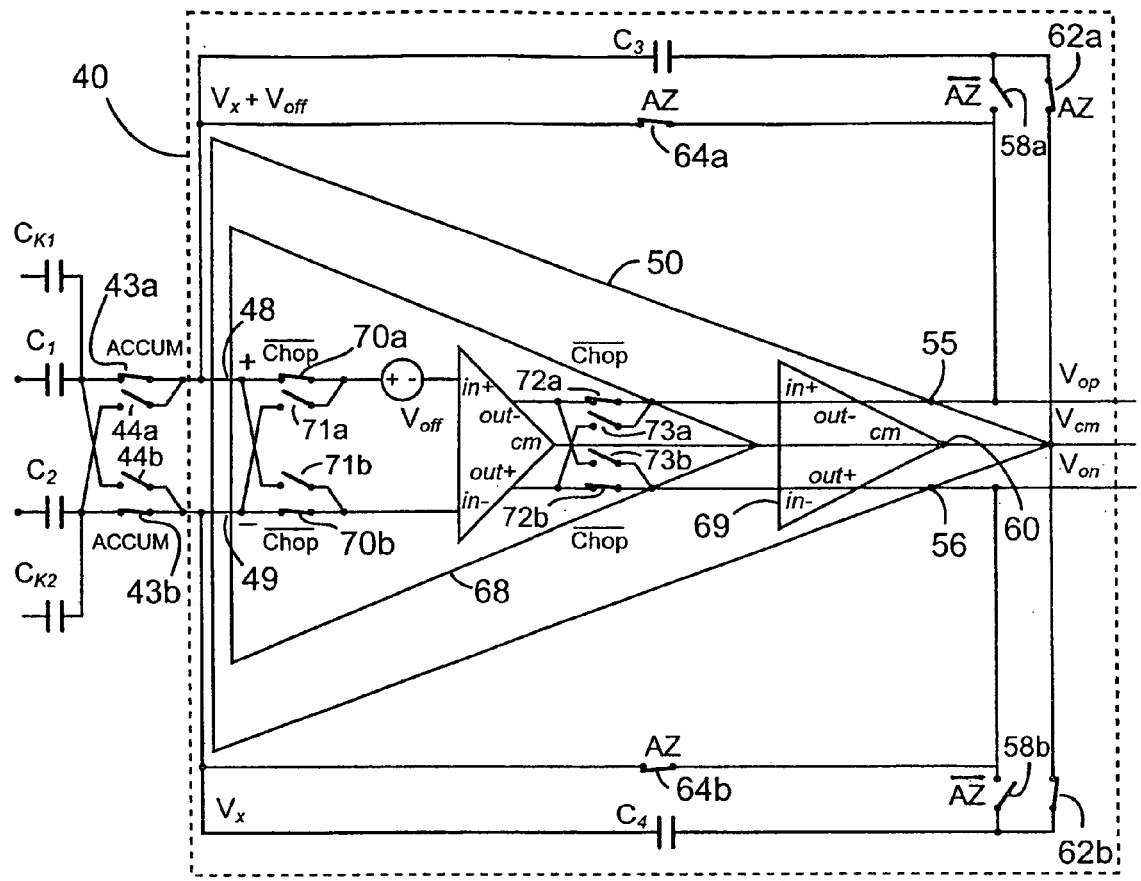
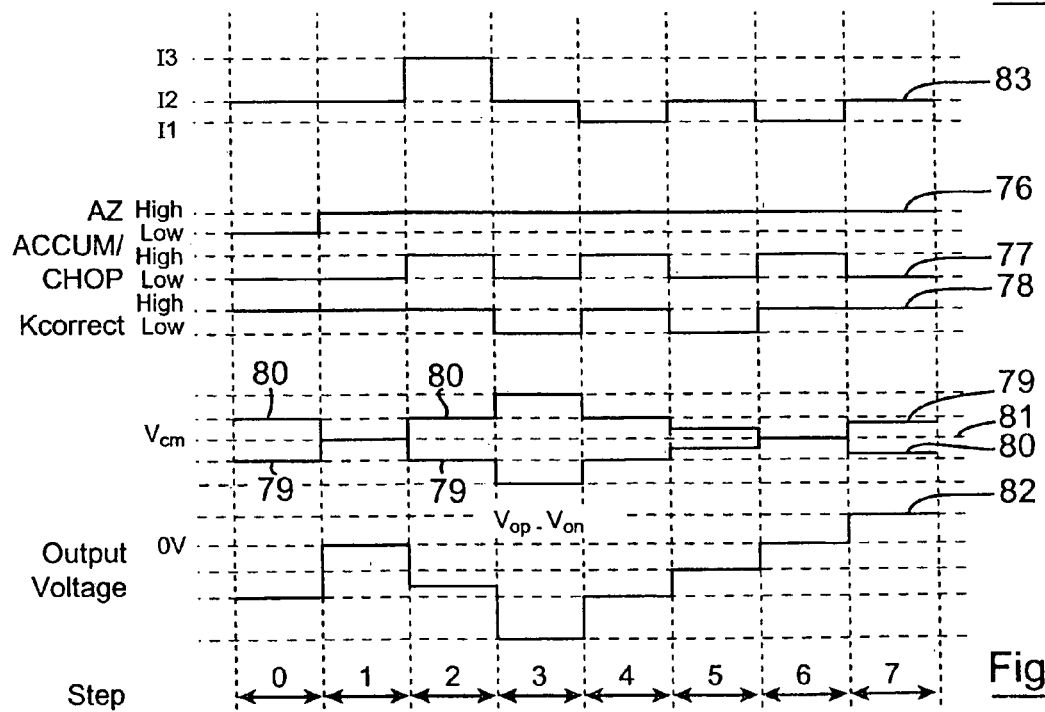
Fig. 2
Fig. 3

METHOD AND A MEASURING CIRCUIT FOR DETERMINING TEMPERATURE FROM A PN JUNCTION TEMPERATURE SENSOR, AND A TEMPERATURE SENSING CIRCUIT COMPRISING THE MEASURING CIRCUIT AND A PN JUNCTION

FIELD OF THE INVENTION

The present invention relates to a measuring circuit and a method for determining temperature from a device which exhibits an exponential relationship between temperature and voltage in response to an excitation current. Such devices are typically semiconductor devices which include a PN junction, and commonly, are used as temperature sensors. The invention also relates to a temperature sensing circuit incorporating the measuring circuit and such a device acting as a temperature sensor. In particular, the invention relates to such a measuring circuit, a method for determining temperature of such a device, and a temperature sensing circuit in which the effect of series resistance in the current path between the sensor device and the measuring circuit, including series resistance of the device, is minimized or eliminated.

BACKGROUND TO THE INVENTION

Temperature sensing using a device which exhibits an exponential relationship between temperature and voltage in response to an excitation current, such as, for example, a PN junction temperature sensor is well known. In CMOS circuits, such PN junctions commonly are implemented as diode-connected substrate bipolar transistors. Typically, such temperature sensing circuits comprise one or two PN junctions, for example, one or two bipolar transistors, and in general, the bipolar transistor or transistors are diode connected. Temperature sensing circuits which comprise two transistors can provide continuous temperature measurements, while those which comprise one transistor measure the temperature at discrete time intervals. The former type temperature sensing circuit are commonly referred to as continuous type sensing circuits, while the latter are referred to as switched current sensing circuits. All such temperature sensing circuits operate on the principle that the voltage developed across the base/emitter junction of a bipolar measuring transistor, or indeed, any other diode or PN junction, when the PN junction is excited by an excitation current, is complementary to absolute temperature (CTAT), and allowing for unquantifiable factors, such as process variations, is given by the following equation:

$$V_{be}(T) = \frac{kT}{q} \ln \frac{I_c}{I_s} \tag{1}$$

where
  $V_{be}(T)$ is the base/emitter voltage of the transistor at temperature T° Kelvin,
  k is Boltzmann's constant,
  T is absolute temperature in degrees Kelvin,
  q is the electron charge,
  $I_c$ is the collector current of the transistor resulting from the excitation current, and
  $I_s$ is the saturation current of the transistor resulting from the excitation current,
  and the log function is the natural log.

When the two transistors of a continuous temperature sensing circuit are excited by excitation currents, which cause the transistors to operate at respective different current densities, or if the transistor of a switched current temperature sensing circuit is sequentially excited by two excitation currents of different values, which cause the transistor to operate at two different current densities, the difference of the base/emitter voltages between the transistors or transistor operating at the different current densities is proportional to absolute temperature (PTAT) and is given by the equation:

$$\Delta V_{be}(T) = \frac{kT}{q} \ln\left(\frac{I_{e1} \cdot A_2}{I_{e2} \cdot A_1}\right) \tag{2}$$

where
  $\Delta V_{be}(T)$ is the difference of the base/emitter voltages of the transistor or transistors operating at the different current densities at temperature T° Kelvin,
  k, T and q are the same as in equation (1),
  $I_{e1}$ is the emitter current, in the case of a two transistor continuous temperature sensing circuit, of one of the transistors resulting from the excitation current applied to the transistor, and in the case of a switched current temperature sensing circuit resulting from the first excitation current applied to the transistor,
  $I_{e2}$ is the emitter current, in the case of a two transistor continuous temperature sensing circuit, of the other transistor resulting from the excitation current applied to the transistor, and in the case of a switched current temperature sensing circuit, resulting from the second excitation current applied to the transistor,
  $A_1$ is the emitter area of the first transistor in the case of a two transistor continuous temperature sensing circuit, and in the case of a switched current temperature sensing circuit, the emitter area of the single transistor, and
  $A_2$ is the emitter area of the second transistor of a two transistor continuous temperature sensing circuit.

In a switched current temperature sensing circuit the two terms $A_1$ and $A_2$ cancel out, thus leaving equation (2) as:

$$\Delta V_{be}(T) = \frac{kT}{q} \ln \frac{I_{e1}}{I_{e2}} \tag{3}$$

Equations (1) and (3) hold true for a switched current temperature sensing circuit, if one ignores the voltage offset due to the intrinsic base/emitter series resistance of the transistor on the base/emitter voltage. However, in order to take account of the intrinsic base/emitter series resistance of the transistor, equation (1) for a switched current temperature sensing circuit with a diode connected bipolar measuring transistor becomes $$V_{be}(T) = \frac{kT}{q} \ln \frac{I_c}{I_s} + I_e(r_{te} + r_{tb}) \tag{4}$$

where
  $I_e$ is the emitter current of the transistor resulting from the excitation current,
  $r_{te}$ is the intrinsic emitter series resistance of the transistor, and
  $r_{tb}$ is the intrinsic base series resistance of the transistor.

However, equation (4) only holds true if the base/emitter voltage of the transistor is measured directly at the transistor. In many switched current temperature sensing circuits, it is not possible to measure the base/emitter voltage of the transistor directly at the transistor. This is so particularly where a temperature measuring transistor is located remotely of a measuring circuit of a switched current temperature sensing circuit, and the measuring transistor is coupled to the measuring circuit by a two wire connection. Such measuring circuits, typically comprise a current source circuit for providing the excitation currents for exciting the measuring transistor, and a signal processing circuit for processing the base/emitter voltages of the measuring transistor resulting from the excitation currents to produce an output voltage. The output voltage is indicative of the temperature of the measuring transistor. Thus, in such sensing circuits, the excitation currents are applied to the measuring transistor from the measuring circuit on the same two lines as the resulting base/emitter voltages generated in the measuring transistor are applied to the signal processing circuit. In other words, the base/emitter voltages of the transistor are applied to the signal processing circuit along the current path, along which the excitation currents are applied to the measuring transistor. In such switched current temperature sensing circuits, the voltages applied to the signal processing circuit, as well as including the actual base/emitter voltage of the measuring transistor resulting from the corresponding excitation current, also include a voltage component resulting from the intrinsic base/emitter series resistance of the transistor, and a voltage component resulting from the series resistance of the portion of the line forming the current path between a pair of sensing nodes in the current path in the measuring circuit, at which the base/emitter voltage is applied to the signal processing circuit.

In order to take account of such line series resistance, as well as the intrinsic base/emitter series resistance, equation (4) for a switched current temperature sensing circuit with a diode connected bipolar measuring transistor becomes:

$$V_{be}(T) = \frac{kT}{q}\ln\frac{I_c}{I_s} + I_e[(r_{te} + r_{le}) + (r_{tb} + r_{lb})] \quad (5)$$

where $r_{le}$ is the series resistance in the line forming the current path between the emitter of the measuring transistor and the corresponding sensing node in the current path on the emitter side of the measuring transistor, at which the base/emitter voltage is applied to the signal processing circuit, $r_{lb}$ is the series resistance in the line forming the current path between the base of the measuring transistor and the corresponding sensing node in the current path on the base side of the measuring transistor, at which the base/emitter voltage is applied to the signal processing circuit, $r_{te}$ is the intrinsic emitter series resistance of the measuring transistor, and $r_{tb}$ is the intrinsic base series resistance of the measuring transistor.

Equation (5) can be rewritten as follows:

$$V_{be}(T) = \frac{kT}{q}\ln\frac{I_c}{I_s} + I_e(R_e + R_b) \quad (6)$$

where $R_e = (r_{te} + r_{le})$, namely, the sum of the intrinsic emitter series resistance of the measuring transistor, and the line series resistance in the emitter leg of the current path between the measuring transistor and the corresponding sensing node, and $R_b = (r_{tb} + r_{lb})$, namely, the sum of the intrinsic base series resistance of the measuring transistor, and the line series resistor in the base leg of the current path between the measuring transistor and the corresponding sensing node.

Hereafter, in the specification the term "current path series resistance" is intended to refer to the sum of the series resistance $(R_e + R_b)$, namely, the sum of the intrinsic base/emitter series resistance of the measuring transistor and the line series resistance in the current path between the measuring transistor and the sensing nodes.

However, in a switched current temperature sensing circuit comprising a bipolar measuring transistor having its collector connected to ground, account must be taken of the current gain of the measuring transistor. Accordingly, equation (6) for a bipolar measuring transistor with its collector connected to ground becomes:

$$V_{be}(T) = \frac{kT}{q}\ln\frac{I_c}{I_s} + I_e\left(R_e + \frac{R_b}{\beta}\right) \quad (6a)$$

where $\beta$ is the current gain of the measuring transistor.

In a switched current temperature sensing circuit which comprise a single measuring transistor, if a is the ratio between the two excitation currents which are alternately forced into the measuring transistor, the following is the relationship between the currents in the measuring transistor:

$$a = \frac{I_{c2}}{I_{c1}} = \frac{I_{e2}}{I_{e1}} = \frac{I_{b2}}{I_{b1}}$$

where $I_{c1}$ and $I_{c2}$ are the two collector currents in the measuring transistor, $I_{e1}$ and $I_{e2}$ are the two emitter currents in the measuring transistor, and $I_{b1}$ and $I_{b2}$ are the two base currents in the measuring transistor, all of which result from the two excitation currents.

Accordingly, if N is the number of times the first excitation current is forced into the measuring transistor, and M is the number of times the second excitation current is forced into the measuring transistor, then the following equation can be derived from equation (6) where the measuring transistor is diode connected:

$$MV_{be2}(T) - NV_{be1}(T) = \quad (7)$$

$$\frac{k \cdot T}{q}\left[M\ln\left(\frac{I_{c2}}{I_s}\right) - N\ln\left(\frac{I_{c1}}{I_s}\right)\right] + (MI_{e2} - NI_{e1})\cdot(R_e + R_b)$$

Since $I_{e2}=aI_{e1}$, equation (7) can be rewritten as:

$$MV_{be2}(T) - NV_{be1}(T) = \frac{k \cdot T}{q} \cdot \ln\left[\frac{I_{c2}^M}{I_s^M} \cdot \frac{I_s^N}{I_{c1}^N}\right] + I_{e1}(Ma - N) \cdot (R_e + R_b) \quad (8)$$

Equations (7) and (8) for a switched current measuring circuit comprising a bipolar measuring transistor, having its collector connected to ground becomes:

$$MV_{be2}(T) - NV_{be1}(T) = \quad (7a)$$
$$\frac{k \cdot T}{q}\left[M\ln\left(\frac{I_{c2}}{I_s}\right) - N\ln\left(\frac{I_{c1}}{I_s}\right)\right] + (MI_{e2} - NI_{e1}) \cdot \left(R_e + \frac{R_b}{\beta}\right)$$

$$MV_{be2}(T) - NV_{be1}(T) = \frac{k \cdot T}{q} \cdot \ln\left[\frac{I_{c2}^M}{I_s^M} \cdot \frac{I_s^N}{I_{c1}^N}\right] + I_{e1}(Ma - N) \cdot \left(Re + \frac{R_b}{\beta}\right) \quad (8a)$$

In order to cancel the effect of the current path series resistance M a must equal N. However, to remove the dependence on $I_s$, M must be equal to N. If M is equal to N, and if the effect of the current path series resistance is to be cancelled, then a must be equal to one. This could only happen if the two excitation currents were of equal value, and thus the result would be zero volts for all temperatures, since the log of one equals zero. Accordingly, from equation (8) it can be seen that in a switched current temperature sensing circuit using two excitation currents, one can either remove the dependence on the saturation current $I_s$, or the voltage offset due to the effect of the current path series resistance, but not both at the same time.

A switched current temperature sensing circuit suitable for determining temperature of a measuring transistor, in which two excitation currents of different values are applied to a measuring transistor is disclosed in U.S. Pat. No. 6,097,239 of Miranda, et al. The temperature sensing circuit of Miranda provides an output voltage, which is derived from an accumulation of a plurality of voltage differences $\Delta V_{be}$ of the base/emitter voltage of the measuring transistor, resulting from excitations of the measuring transistor with the two excitation currents a number of times, and is thus indicative of the temperature of the measuring transistor. However, while the temperature sensing circuit of Miranda operates to remove the dependence on saturation current in the measuring transistor, the temperature sensing circuit of Miranda, since it operates with two excitation currents only, fails to cancel the effect of current path series resistance in the output voltage.

In order to remove the dependence on saturation current in a measuring transistor, and also to cancel the effect of current path series resistance in the output voltage of a switched current temperature sensing circuit, it has been suggested in U.S. Pat. No. 5,195,827 of Audy and Gilbert to force three excitation currents of different values sequentially through a measuring transistor.

However, low voltage switched current temperature sensing circuits are, in general, unsuitable for use with more than two excitation currents of different values. Typically, low voltage switched current temperature sensing circuits are implemented in CMOS, such as the temperature sensing circuits described in U.S. Pat. No. 6,097,239 of Miranda. The signal processing circuit which processes the base/emitter voltages of the measuring transistor resulting from the excitation currents for determining the voltage difference in the base/emitter voltage resulting from excitation with two different excitation currents, in general, comprise a switched capacitor integrating circuit which includes an operational amplifier (op-amp). The op-amp outputs a voltage which corresponds to the difference in the base/emitter voltages resulting from two or more excitations of the measuring transistor with the two excitation currents, and this voltage is indicative of the temperature of the measuring transistor. However, the voltage headroom in such op-amps, in general, is limited to a maximum of 5 volts. Since in general, the measuring transistor is biased at a voltage in the range of 0.2 volts to 0.7 volts, the remaining voltage headroom in the operational amplifier, in practice, is limited to approximately 4 volts.

The relationship between the base/emitter voltage of the measuring transistor and the excitation currents is a logarithmic relationship, and accordingly, a large ratio between the excitation currents is required in order to obtain a reasonable voltage difference between two base/emitter voltages resulting from excitations of the measuring transistor with the respective excitation currents. The ratio of the excitation currents should be such as to produce a voltage difference between the base/emitter voltages with an adequate signal to noise ratio in order to overcome inherent noise in the signal processing circuit. In such switched current temperature sensing circuits where the excitation currents are applied to the measuring transistor on the same lines as the base/emitter voltages are applied to the signal processing circuit, if the line series resistance is high, the base/emitter voltage applied to the signal processing circuit will include a significant voltage component resulting from the line series resistance, as well as a voltage component resulting from the intrinsic base/emitter series resistance of the measuring transistor, as has been discussed above. These voltage components are directly proportional to the entire series resistance in the current path through the base and emitter of the measuring transistor and the lines between the measuring transistor and the sensing nodes, across which the base/emitter voltage is applied to the signal processing circuit. The voltage components resulting from the entire current path series resistance is also directly proportional to the excitation currents. Thus, the higher the excitation current, and the higher the current path series resistance, the greater will be the ratio of the current path series resistance voltage components to the actual base/emitter voltage resulting from excitation of the measuring transistor, since the relationship between the base/emitter voltage and the excitation current is a logarithmic relationship. Since the voltage headroom of the operational amplifier in such temperature sensing circuits is relatively low, it is possible for the voltages in the op-amp during processing of the base/emitter voltages to exceed the voltage headroom. In such cases, the resulting output voltage of the op-amp will not be indicative of the temperature of the measuring transistor.

While the ratio of the excitation currents in such temperature sensing circuits can be selected, where two excitation currents are applied to the measuring transistor, in order to avoid exceeding the voltage headroom within the op-amp, in general, if such switched current temperature sensing circuits were to be used with three excitation currents of different values, the voltage headroom of the op-amp would be exceeded. The three excitation currents, namely, a high value current, a low value current, and an intermediate value current of intermediate value between the high and the low value currents, would have to be of such values as to provide a sufficient ratio between the intermediate value current and the high value current, on the one hand, and the intermediate value current and the low value current on the other hand, in order to provide corresponding base/emitter voltages with sufficient voltage difference between the respective base/emitter voltages. Due to the range between the high value excitation current and the low value excitation current, in general, the voltage headroom within the op-amp would be exceeded. This would be particularly so in the case of a switched current temperature sensing circuit in which the measuring transistor is located remotely of the measuring circuit, and the measuring transistor is coupled to the measuring circuit by a two wire connection, whereby the three excitation currents are applied to the measuring transistor along the same lines as the resulting base/emitter voltages are applied to the signal processing circuit of the measuring circuit.

There is therefore a need for a measuring circuit and a method for determining temperature from a PN junction temperature sensor which overcomes these problems and which minimises the effect of current path series resistance on the measured temperature value. Indeed, there is a need for a measuring circuit and a method for determining temperature of a device which exhibits an exponential relationship between temperature and voltage in response to an excitation current, in which the effect of current path series resistance is minimised, and there is also a need for a switched current temperature sensing circuit which similarly overcomes these problems, and in which the effect of current path series resistance is minimised.

The present invention is directed towards providing such a measuring circuit, a method and a switched current temperature sensor.

SUMMARY OF THE INVENTION

According to the invention there is provided a method for determining temperature of a device which exhibits an exponential relationship between temperature and voltage in response to an excitation current, comprising the acts of:
sequentially applying at least three excitation currents of different values to the device along a current path in a predetermined current sequence for sequentially exciting the device for developing successive voltage values across the device in response to the excitation currents,
sensing successive voltages developed across two sensing nodes in the current path on opposite sides of the device in response to the excitation currents, and
combining the differences of the successive sensed voltages for determining a voltage indicative of the temperature of the device,
wherein,
the predetermined current sequence is selected so that as the differences of the successive sensed voltages developed across the two sensing nodes in the current path are being combined, the cumulative effect, in the sensed voltages, of voltage components resulting from series resistance in the current path between the two sensing nodes through the device is minimised, and
the number of times the device is subjected to excitation by the excitation currents during the predetermined current sequence is selected so that the effect of the voltage components resulting from the series resistance in the current path between the two sensing nodes in the determined voltage indicative of the temperature of the device is substantially eliminated.

In one embodiment of the invention, the predetermined current sequence is selected so that each excitation current with which the device is excited is different to the excitation current with which the device had been previously excited.

Preferably, the predetermined current sequence is selected so that each excitation current with which the device is excited is of value closest to the value of the excitation current with which the device had been previously excited when the values of the currents in the predetermined sequence are being applied to the device in increasing order and decreasing order. Advantageously, the predetermined current sequence is selected so that the device is not sequentially excited by the excitation currents of highest and lowest values.

In another embodiment of the invention, the predetermined current sequence is selected so that the first excitation current of the predetermined current sequence is the excitation current which is closest to the average value of the excitation current of highest value and the excitation current of lowest value. Preferably, the predetermined current sequence is selected so that the second excitation of the predetermined current sequence is the excitation current of highest value.

In a further embodiment of the invention, the predetermined current sequence comprises excitation currents of three different values, namely, one excitation current of a high current value, one excitation current of a low current value, and one excitation current of an intermediate value, intermediate the high and the low current values.

Preferably, the differences of the successive sensed voltages developed across the two sensing nodes are combined during excitation of the device with the excitation currents in the predetermined current sequence, so that the determined voltage indicative of the temperature of the device is derived from the difference of at least one difference of the sensed voltages resulting from excitation of the device by two of the excitation currents, and at least one difference of the sensed voltages resulting from excitation of the device with one of the said two excitation currents and another one of the at least three excitation currents. Preferably, the differences of the successive sensed voltages developed across the two sensing nodes are combined during excitation of the device with the excitation currents in the predetermined current sequence, so that the determined voltage indicative of the temperature of the device is derived from a plurality of differences of the sensed voltages resulting from excitation of the device by two of the excitation currents, and a plurality of differences of the sensed voltages resulting from excitation of the device with one of the said two excitation currents and another one of the at least three excitation currents.

In one embodiment of the invention, the predetermined current sequence is selected so that the combined value of differences of the successive sensed voltages developed across the two sensing nodes resulting from excitation of the device by the currents in the predetermined current sequence initially progressively decreases to a minimum value, and then progressively increases.

In another embodiment of the invention, the device is subjected to an even number of excitations by the excitation currents in the predetermined current sequence.

In a further embodiment of the invention, the device is subjected to the excitation currents for a plurality of the predetermined current sequences sequentially for compounding the voltage indicative of the temperature of the device determined during each predetermined current sequence in the next predetermined current sequence.

In a still further embodiment of the invention, a Kelvin offset correction voltage is combined with the differences of the successive sensed voltages developed across the two sensing nodes, as the differences of the successive sensed voltages are being combined, for altering the voltage indicative of temperature of the device, so that a value of the voltage indicative of the temperature of the device of zero volts corresponds substantially to the lowest theoretical temperature of the temperature range within which the device is to be operational. Preferably, the Kelvin offset correction voltage is provided as a coarse Kelvin correcting voltage and a fine Kelvin correcting voltage. Advantageously, the values of the coarse and fine Kelvin correcting voltages are selected so that the coarse and fine Kelvin correcting voltages are combined with the voltage differences more than once as the device is subjected to the excitation currents during the predetermined current sequence. Preferably, the number of times the coarse and fine Kelvin correcting voltages are combined with the voltage differences as the device is subjected to the excitation currents during each predetermined current sequence is less than the number of voltage difference combinations during each predetermined current sequence.

In one embodiment of the invention, the differences of the successive sensed voltages developed across the two sensing nodes resulting from excitation of the device by the excitation currents in the predetermined current sequence are combined by integration. Preferably, the integrating circuit in which the differences of the successive sensed voltages developed across the two sensing nodes are integrated is a switched capacitor integrating circuit comprising a differential operational amplifier, and an offset voltage of the operational amplifier is compensated for by chopping its input pair in phase with the integration of the differences of the successive sensed voltages developed across the two sensing nodes, as the differences are being integrated.

In one embodiment of the invention, the device which exhibits an exponential relationship between temperature and voltage in response to an excitation current is a PN junction.

In another embodiment of the invention, the PN junction is formed by a bipolar transistor having a current gain which is substantially constant within its operating range of collector currents.

In a further embodiment of the invention, the PN junction is formed by the base/emitter junction of the bipolar transistor, and the excitation currents in the predetermined current sequence are applied to the emitter of the transistor for developing the successive voltage values as base/emitter voltages of the transistor.

In one embodiment of the invention, the bipolar transistor is a substrate bipolar transistor.

In a further embodiment of the invention, the bipolar transistor is diode connected.

In a still further embodiment of the invention, the collector of the bipolar transistor is connected to a fixed voltage.

In one embodiment of the invention, the successive voltage values developed across the device in response to the excitation currents being applied in the predetermined current sequence, are filtered by placing a resistive element of a filter in the current path in series with the device between the device and at least one of the sensing nodes.

In another embodiment of the invention, the excitation currents of respective different values are derived from a plurality of identical current sources by selecting the appropriate number of current sources to provide the respective excitation currents. Preferably, the excitation currents of values less than the excitation current of highest value are derived from the current sources by selecting a different combination of current sources each time each one of the excitation currents of values less than the excitation current of highest value is to be derived.

The invention also provides a measuring circuit for determining temperature of a device which exhibits an exponential relationship between temperature and voltage in response to an excitation current, the circuit comprising:
 a current supply circuit for supplying at least three excitation currents of different values for exciting the device,
 a first switch circuit for selectively and sequentially applying the excitation currents to the device along a current path for sequentially exciting the device for developing successive voltage values across the device in response to the excitation currents,
 an integrating circuit coupled to two sensing nodes in the current path on opposite sides of the device for sensing successive voltages developed across the sensing nodes in response to the excitation currents, and for combining the differences of the successive sensed voltages for determining a voltage indicative of the temperature of the device,
 a control circuit for controlling the first switch circuit for applying the excitation currents to the device in a predetermined current sequence so that the successive sensed voltages developed across the two sensing nodes in response to the excitation currents in the predetermined current sequence is such that as the differences of the successive sensed voltages are being combined in the integrating circuit, the cumulative effect, in the sensed voltages, of voltage components resulting from series resistance in the current path between the two sensing nodes through the device is minimised, and
 controlling the number of times the excitation currents are applied to the device in the predetermined current sequence so that the effect of the voltage components resulting from the series resistance in the current path between the two sensing nodes in the determined voltage indicative of the temperature of the device is substantially eliminated.

In one embodiment of the invention, the control circuit controls the first switch circuit for applying the excitation currents to the device in the predetermined current sequence so that each excitation current with which the device is excited is different to the excitation current with which the device had been previously excited. Preferably, the control circuit controls the first switch circuit for applying the excitation currents to the device in the predetermined current sequence so that each excitation current with which the device is excited is of value closest to the value of the excitation current with which the device had been previously excited when the values of the currents in the predetermined sequence are being applied to the device in increasing order and decreasing order. Advantageously, the control circuit controls the first switch circuit for applying the excitation currents to the device in the predetermined current sequence, so that the device is not sequentially excited by the excitation currents of highest and lowest values.

In another embodiment of the invention, the control circuit controls the first switch circuit for applying the excitation currents to the device in the predetermined current sequence so that the excitation current with which the device is first excited in the predetermined current sequence is the excitation current which is closest to the average value of the excitation current of highest value and the excitation current of lowest value. Preferably, the control circuit controls the first switch circuit for applying the excitation currents to the device in the predetermined current sequence so that the second excitation of the device is with the excitation current of highest value.

In another embodiment of the invention, the current supply circuit provides excitation currents of three different values for exciting the device in the predetermined current sequence, one of the excitation currents being of a high current value, one of the excitation currents being of a low current value, and one of the excitation currents being of an intermediate value, intermediate the high and the low current values.

In a further embodiment of the invention, the integrating circuit combines the differences of the successive sensed voltages developed across the two sensing nodes during excitation of the device with the excitation currents in the predetermined current sequence so that the determined voltage indicative of the temperature of the device is derived from the difference of at least one difference of the sensed voltages resulting from excitation of the device by two of the excitation currents, and at least one difference of the sensed voltages resulting from excitation of the device with one of the said two excitation currents and another of the at least three excitation currents. Preferably, the integrating circuit combines the differences of the successive sensed voltages developed across the two sensing nodes during excitation of the device with the excitation currents in the predetermined current sequence so that the determined voltage indicative of the temperature of the device is derived from a plurality of differences of the sensed voltages resulting from excitation of the device by two of the excitation currents, and a plurality of differences of the sensed voltages resulting from excitation of the device with one of the said two excitation currents and another of the at least three excitation currents.

In one embodiment of the invention, the control circuit controls the first switch circuit for applying the excitation currents to the device in the predetermined current sequence so that the device is excited an even number of times.

In another embodiment of the invention, the control circuit controls the first switch circuit for applying the excitation currents to the device in the predetermined current sequence for a plurality of predetermined current sequences sequentially, and the integrating circuit combines the differences of the successive sensed voltages during excitation of the device with the excitation currents in the plurality of sequential predetermined current sequences for compounding the voltage indicative of the temperature of the device determined during each predetermined current sequence in the next predetermined current sequence.

In a further embodiment of the invention, the integrating circuit combines a Kelvin offset correction voltage with the differences of the sensed voltages developed across the two sensing nodes for altering the voltage indicative of temperature of the device, so that a value of the voltage indicative of the temperature of the device of zero volts corresponds substantially to the lowest theoretical temperature of the temperature range within which the device is to be operational.

Preferably, the integrating circuit comprises a switched capacitor integrating circuit. Advantageously, the switched capacitor integrating circuit comprises a differential operational amplifier, and a pair of input capacitors, one of which is coupled to one of the sensing nodes, and the other of which is coupled to the other of the sensing nodes, the input capacitors being successively charged by the successive sensed voltages on the respective sensing nodes, a second switch circuit being provided for selectively applying the charges on the input capacitors to respective non-inverting and inverting inputs of the operational amplifier, the second switch circuit being operated under the control of the control circuit for applying the charges on the respective input capacitors to the non-inverting and inverting inputs of the operational amplifier for integration of the differences of successive charges on the respective input capacitors resulting from the excitation currents being applied to the device in the predetermined current sequence so that a differential voltage outputted by the operational amplifier after integration of the differences of the successive charges on the respective input capacitors, resulting from excitation of the device by the excitation currents in the predetermined current sequence is the voltage indicative of the temperature of the device. Preferably, the second switch circuit is operated under the control of the control circuit so that the successive charges on the respective input capacitors are alternately switched to the non-inverting and inverting inputs of the operational amplifier.

In one embodiment of the invention, the signals on the non-inverting and inverting inputs of the operational amplifier are chopped in phase with the integration of the differences of the successive charges on the respective input capacitors for eliminating the effect of an offset voltage of the operational amplifier on the output voltage indicative of temperature of the device.

In another embodiment of the invention, the first switch circuit is operated under the control of the control circuit for applying the excitation currents to the device in the predetermined current sequence, and the second switch circuit is operated under the control of the control circuit for integration of the differences in the successive charges on the respective input capacitors, so that the differential output voltage of the operational amplifier initially progressively decreases to a minimum value and then progressively increases.

In a further embodiment of the invention, a pair of Kelvin offset correction capacitors are provided for charging by respective corresponding coarse and fine Kelvin correcting voltages for altering the voltage indicative of temperature of the device, so that a value of the voltage indicative of the temperature of the device of zero volts corresponds substantially to the lowest theoretical temperature of the temperature range within which the device is to be operational.

Preferably, a pair of feedback capacitors are coupled to the differential operational amplifier, one of the feedback capacitors coupling the positive output of the operational amplifier with the non-inverting input thereof, and the other feedback capacitor coupling the negative output of the operational amplifier with the inverting input thereof. Preferably, a third switch circuit is provided for selectively discharging the feedback capacitors and for coupling the feedback capacitors between the corresponding one of the negative and positive outputs of the operational amplifier and a common mode output thereof for auto-zeroing the integrating circuit.

Preferably, the current supply circuit comprises a plurality of identical current sources, and the first switch circuit is operated under the control of the control circuit for selecting the appropriate number of the current sources to provide the respective excitation currents. Advantageously, the first switch circuit is operated under the control of the control circuit for selecting a different combination of current sources each time each one of the excitation currents of values less than the excitation current of highest value is to be selected within the predetermined current sequence.

In one embodiment of the invention, a filter is provided for filtering the successive voltage values developed across the device in response to the excitation currents being applied to the device in the predetermined sequence, the filter comprising at least one resistive element located in the current path between the device and at least one of the sensing nodes.

Preferably, the filter comprises a pair of resistive elements located in the current path on respective opposite sides of the device between the device and the respective sensing nodes. Advantageously, the filter is an RC filter, and a capacitive element is provided for coupling the current path on one side of the device extending between the device and one of the sensing nodes, with the current path on the other side of the device extending between the device and the other of the sensing nodes.

In one embodiment of the invention, the circuit comprises the device which exhibits an exponential relationship between temperature and voltage in response to an excitation current.

In another embodiment of the invention, the device which exhibits an exponential relationship between temperature and voltage in response to an excitation current is a PN junction.

In a further embodiment of the invention, the PN junction is formed by a bipolar transistor having a current gain which is substantially constant within its operating range of collector currents.

In a still further embodiment of the invention, the PN junction is formed by the base/emitter junction of the bipolar transistor, and the excitation currents in the predetermined current sequence are applied to the emitter of the transistor for developing the successive voltage values as base/emitter voltages of the transistor.

In one embodiment of the invention, the bipolar transistor is a substrate bipolar transistor.

In another embodiment of the invention, the bipolar transistor is diode connected.

In a further embodiment of the invention, the collector of the bipolar transistor is connected to a fixed voltage.

ADVANTAGES OF THE INVENTION

The advantages of the invention are many. By virtue of the fact that the method and the measuring circuit eliminate the effect of current path series resistance, the resulting voltage outputted by the measuring circuit after a measuring cycle, which is indicative of the temperature of the device, the temperature of which is being measured, is an accurate representation of the temperature of the device. Additionally, by virtue of the fact that the effect of current path series resistance on the output voltage which is indicative of the temperature of the device is eliminated, the excitation currents may be applied to the device on the same lines as the voltages developed across the device resulting from the excitation currents are applied to the measuring circuit. This, thus, permits accurate measuring of the temperature of the device, the temperature of which is to be measured with two wires only.

This is a particularly important advantage in integrated circuits, where minimisation of pin count is critical. For example, it is common in the fabrication of integrated circuits to embed a temperature sensor device, for example, a substrate bipolar transistor within the integrated circuit for facilitating measuring of the operating temperature of the integrated circuit. The embedded device typically is connected to two pins only of the integrated circuit. The device may be provided within the integrated circuit a considerable distance from the two pins, thus resulting in line series resistance between the device and the pins. The provision of only two pins requires that the excitation currents and the measuring of the voltages developed across the device resulting from excitation of the device by the excitation currents must be carried out on the same two pins. However, by eliminating the effect of current path series resistance, each excitation current may be applied to the device through the two pins, and the resulting voltage developed across the device resulting from the excitation current can be simultaneously measured on the same two pins without adversely affecting the temperature measurement.

Additionally, by virtue of the fact that the effect of current path series resistance is eliminated permits the measuring circuit to be located remotely of the device, the temperature of which is to be measured, thereby permitting the measuring circuit to be located in any convenient location in a system where the temperature of the device is to be measured by the measuring circuit. Furthermore, the measuring circuit can be connected to the device by two wires only, and the excitation currents can be applied to the device along the same two wires as the voltages developed across the device are applied to the signal processing circuit in the measuring circuit.

Additionally, the fact that the effect of current path series resistance is eliminated, has the added advantage that the effect of intrinsic current path series resistance within the device, for example, intrinsic base/emitter series resistance of a substrate bipolar transistor is also eliminated, and thus has no effect on the voltage which is indicative of the temperature of the device.

Furthermore since the effect of current path series resistance on the output voltage indicative of the temperature of the device is eliminated, calibration of the temperature sensing circuit to take account of voltage offset due to current path series resistance is not required.

In particular, by virtue of the fact that the excitation currents are applied to the device in the predetermined current sequence so that as the differences of the successive sensed voltages developed across the two sensing nodes in the current path are being combined, the cumulative effect, in the sensed voltages, of the components resulting from series resistance in the current path between the two sensing nodes through the device is minimised, the measuring circuit according to the invention and the method according to the invention for determining temperature of the device is particularly suitable for implementation in low voltage circuits, for example, CMOS circuits and the like. Additionally, by virtue of the fact that the effect of series resistance in the current path on the output voltage indicative of the temperature of the device is eliminated, and furthermore, by virtue of the fact that the excitation currents are applied in the predetermined sequence so that as the differences of the successive sensed voltages developed across the two sensing nodes in the current path are being combined, the cumulative effect, in the sensed voltages, of the components resulting from series resistance in the current path between the two sensing nodes through the device is minimised, the measuring circuit and the method according to the invention permit the inclusion of a filter between the device and the measuring circuit which may comprise resistive elements in the current paths on one side or on both sides of the device between the respective sensing nodes, and furthermore, even with the inclusion of such a filter with resistive elements in the current path, the measuring circuit and the method is still suitable for implementation in low voltage circuits, such as, for example, CMOS circuits and the like.

Additionally, since the effect of current path series resistance on the output voltage indicative of the temperature of the device is eliminated, variations in the resistance in the current path, for example, as a result of temperature fluctuations and the like, have no effect on the output voltage which is indicative of the temperature of the device, and furthermore, the fluctuation in current path series resistance can be accommodated in low voltage circuits, such as, for example, CMOS circuits and the like.

The invention and its advantages will be more clearly understood from the following description of a preferred embodiment thereof, which is given by way of example only, with reference to the accompanying drawings.

BRIEF DESCRIPTION OF THE DRAWINGS

FIG. 2 is a circuit diagram of a detail of the temperature sensing circuit of FIG. 1, FIG. 3 illustrates waveforms of signals generated in the temperature sensing circuit during operation thereof.

DETAILED DESCRIPTION OF A PREFERRED EMBODIMENT OF THE INVENTION

Figure 1:
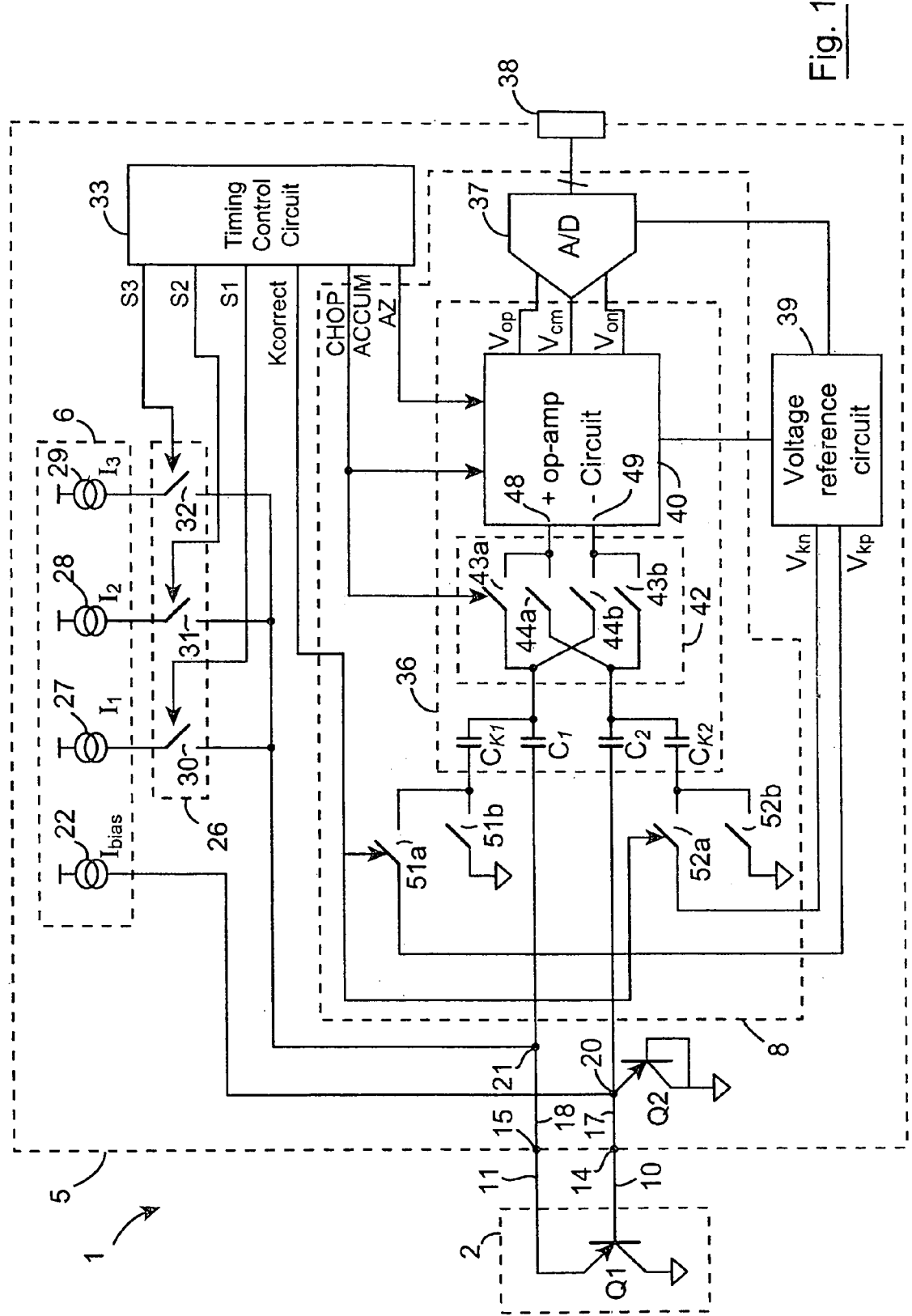
FIG. 1 is a block representation of a switched current temperature sensing circuit according to the invention.

Referring to the drawings, there is illustrated a switched current temperature sensing circuit according to the invention, indicated generally by the reference numeral 1, for determining temperature sensed by a temperature sensor 2, which comprises a PN junction. In this embodiment of the invention the PN junction of the sensor 2 is provided by a PNP substrate bipolar measuring transistor Q1, the collector of which is connected to a fixed voltage, in this case ground, and which is formed by a CMOS process. The measuring transistor Q1 is selected so that its current gain is substantially constant over its operating range of collector currents, in order to avoid current gain errors in the measured results. In this embodiment of the invention the measuring transistor Q1 is selected so that the current gain variation over the operating range of the collector currents is less than 1%. A measuring circuit 5 also according to the invention which forms a part of the temperature sensing circuit 1 comprises a current source circuit 6 for sequentially supplying excitation currents for exciting the measuring transistor Q1 during a temperature measuring cycle, and a signal processing circuit 8 for processing base/emitter voltages developed by the measuring transistor Q1 during the measuring cycle in response to excitation by the excitation currents from the current source circuit 6. The measuring circuit 5 including the current source circuit 6 and the signal processing circuit 8 is implemented as a single chip integrated circuit formed by a CMOS process. The measuring transistor Q1 of the sensor 2 may be integrally formed in the same integrated circuit as the measuring circuit 5, however, in this embodiment of the invention the sensor 2 with the measuring transistor Q1 is remotely located relative to the measuring circuit 5. Typically the measuring transistor Q1 would be a substrate bipolar transistor formed on a separate integrated circuit chip, although it is not necessary that the measuring transistor be a substrate transistor.

A pair of lines, namely, a base line 10 and an emitter line 11 couple the measuring transistor Q1 to the measuring circuit 5. Pins 14 and 15 are provided on the measuring circuit 5 for coupling the base and emitter lines 10 and 11, respectively, to the measuring circuit 5. Electrically conductive base and emitter tracks 17 and 18, respectively, of the measuring circuit 5 extend from the pins 14 and 15 to voltage sensing nodes 20 and 21, respectively, at which the base/emitter voltages developed by the measuring transistor Q1 during a measuring cycle are sensed by the signal processing circuit 8. A biasing transistor Q2 coupled to the base track 17 at the sensing node 20 biases the base of the measuring transistor Q1 at a voltage between 0.5 volts and 0.7 volts, and in this embodiment of the invention at a bias voltage of approximately 0.65 volts. The biasing transistor Q2 is a diode connected PNP substrate bipolar transistor integrally formed by the CMOS process in the measuring circuit 5. A bias current source 22 in the current source circuit 6 provides a bias current $I_{bias}$ for biasing the emitter of the biasing transistor Q2. The excitation currents from the current source circuit 6 for sequentially exciting the measuring transistor Q1 during a measuring cycle are applied to the emitter track 18 at the sensing node 21.

In this embodiment of the invention three excitation currents $I_1$, $I_2$ and $I_3$ of different values are supplied by the current source circuit 6. The excitation current $I_1$ is a low value current, the excitation current $I_3$ is a high value current and the excitation current $I_2$ is an intermediate value current of value intermediate the high and low value excitation currents. As will be described below the three excitation currents are sequentially applied to the emitter of the measuring transistor Q1 in a predetermined current sequence during each measuring cycle for developing a plurality of successive base/emitter voltages in the measuring transistor Q1. The base/emitter voltages of the measuring transistor Q1 are sequentially applied to the signal processing circuit 8 across the sensing nodes 20 and 21, which in turn computes a plurality of voltage differences $\Delta V_{be}$ of the successive base/emitter voltages. The signal processing circuit 8 as will be described below combines the voltage differences $\Delta V_{be}$, so that at the end of each measuring cycle, the voltage outputted by the signal processing circuit 8 is indicative of the temperature of the measuring transistor Q1. By exciting the measuring transistor Q1 with the three excitation currents $I_1$, $I_2$ and $I_3$, the effect of current path series resistance between the sensing nodes 20 and 21 through the measuring transistor Q1 on the voltage outputted by the signal processing circuit 8 at the end of each measuring cycle is eliminated, as is the dependence on the saturation current in the measuring transistor Q1 resulting from the excitation currents $I_1$, $I_2$ and $I_3$.

Since the base/emitter voltages resulting from the excitation of the measuring transistor Q1 are applied to the signal processing circuit 8 across the sensing nodes 20 and 21, and since each excitation current is applied to the measuring transistor Q1 through the sensing nodes 20 and 21 simultaneously while the resulting base/emitter voltage is being applied to the signal processing circuit 8 across the sensing nodes 20 and 21, the voltage across the nodes 20 and 21 as well as including a base/emitter voltage resulting from the corresponding excitation current, also includes a voltage component resulting from the intrinsic base/emitter series resistance of the measuring transistor Q1, and a voltage component resulting from the line series resistance between the measuring transistor Q1 and the sensing nodes 20 and 21. The temperature sensing circuit 1 and the method according to the invention eliminates the effect of the intrinsic base/emitter series resistance of the measuring transistor Q1, as well as the line series resistance in the lines between the measuring transistor Q1 and the sensing nodes 20 and 21. The term "$R_e$" which will be used in the equations from here on includes all the line series resistance between the measuring transistor Q1 and the sensing node 21, namely, series resistance in the emitter line 11 and the emitter track 18, as well as the intrinsic series resistance of the emitter of the measuring transistor Q1. The term "$R_b$" which will be used in the equations from here on includes all the line series resistance between the measuring transistor Q1 and the sensing node 20, namely, series resistance in the base line 10 and the base track 17, as well as the intrinsic series resistance of the base of the measuring transistor Q1.

Before describing the measuring circuit 5 in further detail, the theory behind the measuring circuit and the method according to the invention will first be described.

The excitation currents $I_2$ and $I_1$ are selected so that the ratio of the excitation currents $I_2$ to $I_1$ is equal to a, and the excitation current $I_3$ is selected so that the ratio of the excitation current $I_3$ to the excitation current $I_1$ is b. Accordingly, $$a = \frac{I_2}{I_1} = \frac{I_{c2}}{I_{c1}} = \frac{I_{e2}}{I_{e1}} = \frac{I_{b2}}{I_{b1}}, \text{ and}$$

$$b = \frac{I_3}{I_1} = \frac{I_{c3}}{I_{c1}} = \frac{I_{e3}}{I_{e1}} = \frac{I_{b3}}{I_{b1}}$$

where $I_{c1}$, $I_{e1}$ and $I_{b1}$ are the collector, emitter and base currents, respectively, in the measuring transistor Q1 resulting from the excitation current $I_1$, $I_{c2}$, $I_{e2}$ and $I_{b2}$ are the collector, emitter and base currents, respectively, in the measuring transistor Q1 resulting from the excitation current $I_2$, and $I_{c3}$, $I_{e3}$ and $I_{b3}$ are the collector, emitter and base currents, respectively, in the measuring transistor Q1 resulting from the excitation current $I_3$.

A measurement taken by forcing the excitation current $I_1$, and then the excitation current $I_2$ into the measuring transistor Q1 produces the following equation for the voltage difference $\Delta V_{be21}(T)$ in the base/emitter voltages $V_{be2}$ and $V_{be1}$ of the measuring transistor Q1 at temperature T:

$$\Delta V_{be21}(T) = V_{be2}(T) - V_{be1}(T) \tag{9}$$

which from equation (6a) can be written as:

$$\Delta V_{be21}(T) = \frac{kT}{q}\ln\left(\frac{I_{c2}}{I_{c1}}\right) + (I_{e2} - I_{e1})\left(R_e + \frac{R_b}{\beta}\right) \tag{10}$$

where $R_e$ and $R_b$ are the total emitter and base series resistance in the current path through the measuring transistor Q1 between the nodes 20 and 21, as already described.

Since $$\frac{I_{c2}}{I_{c1}}$$

is equal to $$\frac{I_{e2}}{I_{e1}},$$

and $I_{e2}$ is equal to $aI_{e1}$, equation (10) becomes:

$$\Delta V_{be21}(T) = \frac{kT}{q}\ln(a) + I_{e1}(a-1)\left(R_e + \frac{R_b}{\beta}\right) \tag{11}$$

A measurement taken by forcing the excitation current $I_2$, and then the excitation current $I_3$ into the measuring transistor Q1 produces the following equation for the voltage difference $\Delta V_{be32}(T)$ in the base/emitter voltages $V_{be3}$ and $V_{be2}$ of the measuring transistor Q1 at temperature T:

$$\Delta V_{be32}(T) = V_{be3}(T) - V_{be2}(T) \tag{12}$$

which from equation (6a) can be written as:

$$\Delta V_{be32}(T) = \frac{kT}{q}\ln\left(\frac{I_{c3}}{I_{c2}}\right) + (I_{e3} - I_{e2})\left(R_e + \frac{R_b}{\beta}\right) \tag{13}$$

Since $I_{e2}$ is equal to $aI_{e1}$, $I_{e3}$ is equal to $bI_{e1}$, $I_{c2}$ is equal to $aI_{c1}$, and $I_{c3}$ is equal to $bI_{c1}$, equation (13) can be written as:

$$\Delta V_{be32}(T) = \frac{kT}{q}\ln\left(\frac{b}{a}\right) + I_{e1}(b-a)\left(R_e + \frac{R_b}{\beta}\right) \tag{14}$$

If M is the number of samples taken of $\Delta V_{be21}(T)$, and N is the number of samples taken of $\Delta V_{be32}(T)$, then subtracting equation (14) from equation (11) gives the following equation:

$$M\Delta V_{be21}(T) - N\Delta V_{be32}(T) = \tag{15}$$

$$\frac{kT}{q}\left[M\ln(a) - N\ln\left(\frac{b}{a}\right)\right] + I_{e1}[M(a-1) - N(b-a)]\left(R_e + \frac{R_b}{\beta}\right)$$

Equation (15) can be rewritten as:

$$M\Delta V_{be21}(T) - N\Delta V_{be32}(T) = \tag{16}$$

$$\frac{kT}{q}\left[\ln\left(\frac{a^{M+N}}{b^N}\right)\right] + I_{e1}[M(a-1) - N(b-a)]\left(R_e + \frac{R_b}{\beta}\right)$$

Accordingly, from equation (16) it can be seen that the dependence on the saturation current $I_s$ has been removed, and the offset due to the current path series resistance ($R_e+R_b$) can be cancelled by setting $$M(a-1)=N(b-a).$$

If M is chosen to be of value 2, and N is chosen to be of value 1, then by choosing the ratio a to be 6, and the ratio b to be 16, the effect of current path series resistance can be eliminated. Thus, the equation to be satisfied is:

$$2\Delta V_{be21}(T)-1\Delta V_{be32}(T)=2(V_{be2}(T)-V_{be1}(T))-(V_{be3}(T)-V_{be2}(T)) \qquad (17)$$

However, for ease and symmetry of operating the signal processing circuit 8 as will be described below, equation (17) is multiplied by 2 to give:

$$4\Delta V_{be21}(T)-2\Delta V_{be32}(T)=4(V_{be2}(T)-V_{be1}(T))-2(V_{be3}(T)-V_{be2}(T)) \qquad (18)$$

Additionally, the fact that equation (17) is multiplied by 2 avoids having to force the minimum and maximum excitation currents, namely, $I_1$ and $I_3$ sequentially into the emitter of the measuring transistor Q1. In other words, there is no need to force the excitation current $I_1$ into the emitter of the measuring transistor Q1 followed by the excitation current $I_3$ or vice versa. Accordingly, the excitation currents $I_1$ and $I_3$ will only be followed by the excitation current $I_2$. The excitation current $I_2$ will only be followed by the excitation currents $I_1$ or $I_3$. This, thus, minimises the effect of voltage offset due to the current path series resistance during integration of the voltage differences $\Delta V_{be}$ in the signal processing circuit 8, thereby avoiding the voltage headroom of the signal processing circuit 8 being exceeded, as will be described below.

Equation (18) can be rewritten as:

$$4\Delta V_{be21}(T)-2\Delta V_{be32}(T)=(V_{be2}-V_{be3})-(V_{be3}-V_{be2})+ \\ (V_{be2}-V_{be1})-(V_{be1}-V_{be2})+(Vbe2-Vbe1)- \\ (Vbe1-Vbe2) \qquad (19)$$

where $V_{be1}$, $V_{be2}$ and $V_{be3}$ are the respective base/emitter voltages at temperature T.

Thus, equation (19) is satisfied by forcing the three excitation currents $I_1$, $I_2$ and $I_3$ into the measuring transistor Q1 during a measuring cycle in the following predetermined current sequence:

$I_2$, followed by $I_3$, followed by $I_2$, followed by $I_1$, followed by $I_2$, followed by $I_1$, and followed by $I_2$.

It is in this predetermined current sequence that the excitation currents are applied to the measuring transistor Q1 by the measuring circuit 5 during a measuring cycle. In order to scale up the output voltage of the signal processing circuit 8 at the end of a measuring cycle, in each measuring cycle the excitation currents $I_1$, $I_2$ and $I_3$ are applied to the measuring transistor Q1 in four sequential predetermined current sequences. In this way the output voltage of the signal processing circuit 8, resulting from the application of the excitation currents at the end of each predetermined current sequence, is compounded in the output voltage resulting from the application of the excitation currents in the next predetermined current sequence. This technique is disclosed in U.S. Pat. No. 6,097,239 of Miranda, et al. Referring now to FIGS. 1 and 2, the measuring circuit 5 will now be described in detail. The current source circuit 6 comprises a plurality of identical constant current sources 25 which are illustrated diagrammatically in FIG. 13, which are formed by a current mirror circuit. In this embodiment of the invention, in order to provide the excitation currents $I_1$, $I_2$ and $I_3$ in the ratios $I_2=6I_1$, and $I_3=16I_1$, sixteen identical constant current sources 25 are provided, each providing a unit current. Thus, when the excitation current $I_1$ is required to be forced into the emitter of the measuring transistor Q1, one of the current sources 25 is selected. Six of the current sources 25 are selected to produce the excitation current $I_2$, while all sixteen of the current sources 25 are selected to produce the excitation current $I_3$. The actual selection of the current sources 25 to produce the three excitation currents $I_1$, $I_2$ and $I_3$ will be described in more detail with reference to FIG. 14. However, for ease of description and illustration in FIG. 1, the three excitation currents, $I_1$, $I_2$ and $I_3$ are illustrated as being derived from three constant current sources in the current source circuit 6, namely, a constant current source 27, which supplies the excitation current $I_1$, a constant current source 28 which supplies the excitation current $I_2$, and a constant current source 29 which supplies the excitation current $I_3$. The excitation currents $I_1$, $I_2$ and $I_3$ are selectively applied to the measuring transistor Q1 from the constant current sources 27, 28 and 29, respectively, through a first switch circuit 26, which comprises CMOS switches 30, 31 and 32, in response to current control signals S1, S2 and S3 from a timing control circuit 33. The current control signals S1, S2 and S3 selectively operate the switches 30, 31 and 32, respectively.

The signal processing circuit 8 comprises a differential switched capacitor integrating circuit 36 for integrating the voltage differences $\Delta V_{be}$ of the successive base/emitter voltages resulting from the excitation currents $I_1$, $I_2$ and $I_3$ being forced into the measuring transistor Q1 in the predetermined current sequence, as will be described below, in order to satisfy equation (19). The voltage resulting from the successive integrations is applied to an analogue to digital converter 37, which in turn converts the resulting voltage to digital form, which is outputted through a digital output port 38, to provide the voltage, which is indicative of the temperature of the measuring transistor Q1. A bandgap voltage reference circuit 39 provides a reference voltage for the analogue to digital converter 37. The analogue to digital converter 37 and the bandgap voltage reference circuit 39 are both formed in the measuring circuit 5 which is implemented as a CMOS integrated circuit.

The integrating circuit 36 comprises a differential op-amp circuit 40, which comprises a differential op-amp 50. The differential op-amp circuit 40 is described in detail below. A pair of input capacitors, $C_1$ and $C_2$ of identical capacitance of the integrating circuit 36 are coupled to the emitter and base, respectively, of the measuring transistor Q1 through the base and emitter lines 10 and 11. The input capacitors $C_1$ and $C_2$ are successively charged by the emitter and base voltages of the measuring transistor Q1 developed at the sensing nodes 21 and 20, respectively, in response to the excitation currents $I_1$, $I_2$ and $I_3$, as the excitation currents $I_1$, $I_2$ and $I_3$ are sequentially forced into the emitter of the measuring transistor Q1 in the predetermined current sequence. A second switch circuit 42 comprising CMOS switches 43a and 43b and CMOS switches 44a and 44b selectively couple the input capacitors $C_{1\ and\ C2}$ to a non-inverting input 48 and an inverting input 49 and vice versa of the op-amp circuit 40 in the appropriate sequence so that the voltage differences $\Delta V_{be}$ of the successive base/emitter voltages of the measuring transistor Q1 resulting from the excitation currents $I_1$, $I_2$ and $I_3$ are integrated according to equation (19). The switches 43a, 43b, 44a and 44b of the second switch circuit 42 are controlled by a switch signal, namely, an ACCUM signal from the timing control circuit 33. The switches 43a and 43b are active low, in other words, operate in the closed circuit state when the ACCUM signal is low, while the switches 44a and 44b are active high, in other words, operate in the closed circuit state when the ACCUM signal is high.

A pair of Kelvin offset correction capacitors $C_{k1}$ and $C_{k2}$ of identical capacitance are provided for correcting for offset in the output voltage from the signal processing circuit 8 at the end of each measuring cycle, so that an output voltage of zero volts from the signal processing circuit 8 at the end of each measuring cycle corresponds to the lowest temperature of the temperature range over which the temperature sensing circuit 1 is to operate. The offset capacitors $C_{k1}$ and $C_{k2}$ are selectively coupled to the non-inverting input 48 and the inverting input 49, and vice versa, of the op-amp circuit 40 through the second switch circuit 42. A coarse Kelvin correcting voltage $V_{kp}$ is selectively applied to the offset capacitor $C_{k1}$ through a CMOS switch 51a from the voltage reference circuit 39 for coarse correcting the offset in the output voltage from the signal processing circuit 8, as will be described below. A fine Kelvin correcting voltage $V_{kn}$ is selectively applied to the offset capacitor $C_{k2}$ through a CMOS switch 52a from the voltage reference circuit 39 for fine correcting the offset in the output voltage from the signal processing circuit 8. The Kelvin offset correction capacitors $C_{k1}$ and $C_{k2}$ are selectively discharged to ground through CMOS switches 51b and 52b, respectively. A switch signal, namely, a Kcorrect signal from the timing control circuit 33 controls the operation of the switches 51a, 51b, 52a and 52b, in a switching sequence which will be described below. The switches 51a and 52b are active high, in other words, operate in the closed circuit state when the Kcorrect signal is high, while the switches 51b and 52a are active low, in other words, operate in the closed circuit state when the Kcorrect signal is low.

The value of the capacitance of the Kelvin offset correction capacitors $C_{k1}$ and $C_{k2}$ and the values of the coarse and fine Kelvin correcting voltages $V_{kp}$ and $V_{kn}$ may be selected so that the voltage correction for the Kelvin offset in the output voltage from the signal processing circuit 8 is made only once, at an appropriate time, during the integration of the voltage differences $\Delta V_{be}$ as the excitation currents $I_1$, $I_2$ and $I_3$ are being sequentially forced into the emitter of the measuring transistor Q1 in each predetermined current sequence. However, in order to minimise the effect of the Kelvin offset correction on any of the integrated values of the voltage differences $\Delta V_{be}$ during integration thereof, and in turn to minimise the danger of the Kelvin offset correction resulting in any of the voltages within the integrating circuit 36 exceeding the voltage headroom of the integrating circuit 36, it is preferable that the value of the capacitance of the Kelvin offset correction capacitors $C_{k1}$ and $C_{k2}$ and the values of the coarse and fine Kelvin correcting voltages $V_{kp}$ and $V_{kn}$ are selected so that, instead of making the correction for the Kelvin offset in the voltage output of the signal processing circuit 8 once during the integration of the voltage differences $\Delta V_{be}$ during each application of the excitation currents to the measuring transistor Q1 in the predetermined current sequence, smaller Kelvin voltage corrections are made a number of times during the integration of the voltage differences $\Delta V_{be}$ during each application of the excitation currents in the predetermined current sequence to the measuring transistor Q1. In this embodiment of the invention the coarse and fine Kelvin correcting voltages are subtracted four times during the integration of the voltage differences $\Delta V_{be}$ as the excitation currents are being sequentially applied to the measuring transistor Q1 in each predetermined sequence. The values of the coarse and fine Kelvin correcting voltages are appropriately selected as will be described below.

Referring now to FIG. 2, the op-amp circuit 40 will now be described. Feedback capacitors $C_3$ and $C_4$ of identical capacitance are coupled between negative and positive outputs 56 and 55 and the non-inverting and inverting inputs 48 and 49 of the op-amp 50 through CMOS switches 58a and 58b. The feedback capacitor $C_3$ is coupled between the negative output 56 and the non-inverting input 48, while the feedback capacitor $C_4$ is coupled between the positive output 55 and the inverting input 49 of the op-amp 50. The capacitors $C_3$ and $C_4$ are also selectively coupled to a common mode output 60 of the op-amp 50 through CMOS switches 62a and 62b for facilitating auto-zeroing of the op-amp 50 as will be described below. CMOS switches 64a and 64b are provided for selectively coupling the negative output 56 to the non-inverting input 48 and the positive output 55 to the inverting input 49 of the op-amp 50 during auto-zeroing of the op-amp 50, as will also be described below. The operation of the switches 58a and 58b, 62a and 62b, and 64a and 64b is controlled by an auto-zero (AZ) signal from the timing control circuit 33. The switches 62a and 62b and 64a and 64b are active low, in other words, operate in the closed state when the AZ signal is low. The switches 58a and 58b are active high, in other words, operate in the closed circuit state when the AZ signal is high.

The op-amp 50 is a two-stage op-amp comprising a first stage 68 and a second stage 69. CMOS chop switches 70a and 70b, 71a and 71b, 72a and 72b, and 73a and 73b are provided in the op-amp 50 for chopping the signals applied to the non-inverting and inverting inputs 48 and 49 through the op-amp 50 for compensating for offset voltage errors in the op-amp 50. The chop switches 70a and 70b, 71a and 71b, 72a and 72b, and 73a and 73b are operated by a CHOP signal from the timing control circuit 33. In this embodiment of the invention the operating sequence of the chop switches 70, 71, 72 and 73 is similar to the operating sequence of the switches 43 and 44 of the second switch circuit 42, and accordingly, the ACCUM signal and the CHOP signal are provided by the same signal. The switches 70a and 70b and 72a and 72b are active low, while the switches 71a and 71b and 73a and 73b are active high. As the signals being applied to the non-inverting and inverting inputs 48 and 49 are chopped through the op-amp 50, the offset voltage of the op-amp 50 is alternately added and subtracted to the integrations being carried out by the integrating circuit 36 so that provided the signals are chopped through the op-amp 50 such that the offset voltage is added to and subtracted from the signals the same number of times, the accumulated effect of the op-amp voltage offset errors on the differential output of the op-amp 50 is cancelled.

In order to provide a better understanding of the temperature sensing circuit 1, the operation of the temperature sensing circuit 1 during the first period of a measuring cycle, during which the excitation currents are sequentially applied to the measuring transistor Q1 for the first of the four predetermined current sequences, will now be described with reference to FIGS. 3 to 11.

The state of the AZ signal, the ACCUM/CHOP signal and the Kcorrect signal are illustrated by the waveforms 76, 77 and 78, respectively, of FIG. 3 during the first period of the measuring cycle during each of eight steps, namely, step 0 to step 7, while the excitation currents are being applied to the measuring transistor Q1 in the first of the four predetermined current sequences. The voltage on the positive output 55 is represented by the waveform 79, and the voltage on the negative output 56 of the op-amp 50 is represented by the waveform 80 during steps 0 to 7. The common mode voltage $V_{cm}$ on the common mode output 60 is represented by the waveform 81, and is constant during the entire measuring cycle. The waveform 82 represents the difference of the voltages on the positive output 55 and the negative output 56 during the steps 0 to 7. The waveform 83 represents the current being applied to the measuring transistor Q1 during the steps 0 to 7. FIGS. 4 to 11 illustrate the state of the switches of the measuring circuit 5 in each of the steps 0 to 7 during the first period of the measuring cycle during which the excitation currents are sequentially applied to the measuring transistor Q1 in the first of the four predetermined current sequences.

Figure 4:
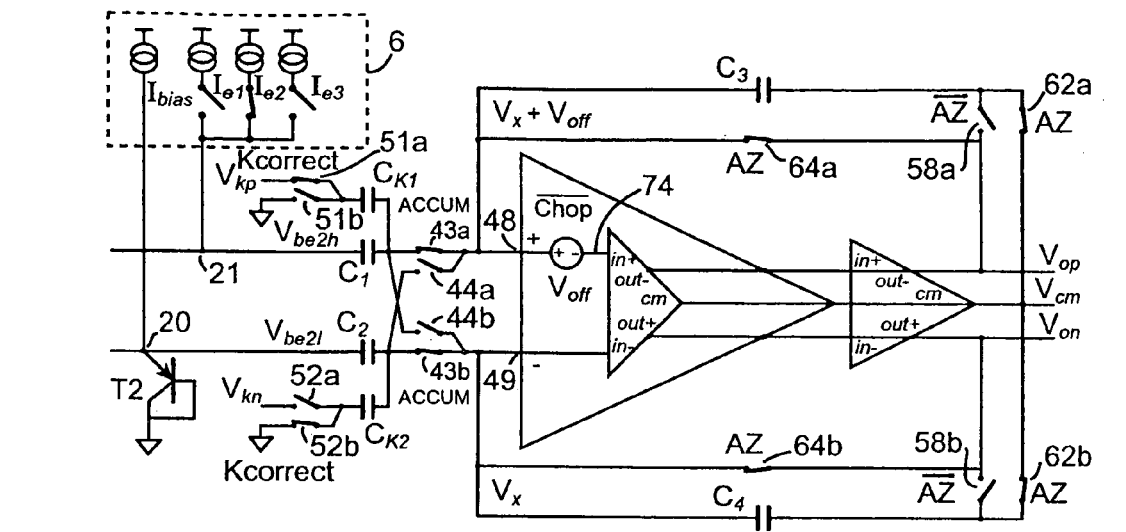
FIGS. 4 to 11 are circuit diagrams similar to FIG. 2 illustrating the state of switches in the circuit of FIG. 2 during operation of the temperature sensing circuit.

Referring to FIGS. 3 and 4, step 0, namely, auto-zeroing of the temperature sensing circuit 1 for resetting the circuit 1 will now be described. The signal processing circuit 8 is auto-zeroed between each temperature measuring cycle. Since the first of the excitation currents to be forced into the emitter of the measuring transistor Q1 in the predetermined current sequence is the excitation current $I_2$, auto-zeroing of the measuring circuit 5 is carried out with the excitation current $I_2$ being forced into the emitter of the transistor Q1. The timing control circuit 33 sets the current control signal S2 at logic high for applying the excitation current $I_2$ to the measuring transistor Q1, and the current control signals S1 and S3 are set at logic low. The AZ signal is set at logic low, the CHOP signal at logic low and the Kcorrect signal at logic high. Accordingly, the switches 62a and 62b and 64a and 64b are operated in the closed circuit state, and the feedback capacitors $C_3$ and $C_4$ are coupled between the common mode output 60 of the op-amp 50 and the non-inverting input 48 and the inverting input 49, respectively. Additionally, the negative output 56 and the positive output 55 of the op-amp 50 are coupled to the non-inverting input 48 and the inverting input 49, respectively. The switches 43a and 43b, and the chop switches 70a and 70b, and 72a and 72b are also operated in the closed circuit state, as are the switches 51a and 52b.

To understand the operation of the temperature sensing circuit 1, the charges on the respective capacitors $C_1$, $C_2$, $C_3$, $C_4$ and $C_{k1}$ and $C_{k2}$ will be considered at the end of each of steps 0 to 7. For convenience the charges on the respective capacitors will be represented in the following equations by the terms $Q_{c1}$, which represents the charge on the capacitor $C_1$, and so on to $Q_{ck2}$, which represents the charge on the capacitor $C_{k2}$. The charge on the capacitor $C_1$ at the end of each step is represented by the term $Q_{c1}[0]$, being the charge at the end of step 0, $Q_{c1}[1]$ being the charge at the end of step 1, and so on to $Q_{c1}[7]$, being the charge at the end of step 7. The charges on the capacitors $C_2$, $C_3$, $C_4$, $C_{k1}$ and $C_{k2}$ at the end of the respective steps are similarly represented.

Accordingly, the charges on the capacitors at the end of step 0, in other words, at the end of auto-zeroing, are given by the following equations:

$Qc1[0] = C1(Vbe2h - (Vx[0] + Voff))$ $Qc2[0] = C2(Vbe2l - Vx[0])$ $Qc3[0] = C3((Vx[0] + Voff) - Vcm)$ $Qc4[0] = C4(Vx[0] - Vcm)$ $Qck1[0] = Ck1(Vkp - (Vx[0] + Voff))$ $Qck2[0] = Ck2(-Vx[0])$ where C1, C2, C3, C4, Ck1 and Ck2 are the capacitances of the respective capacitors $C_1$, $C_2$, $C_3$, $C_4$, $C_{k1}$ and $C_{k2}$, $V_{be2h}$ is the voltage on the sensing node 21 resulting from the base/emitter voltage $V_{be}$ of the measuring transistor Q1 due to the excitation current $I_2$ being forced into the emitter of the measuring transistor Q1, $V_{be2l}$ is the voltage on the sensing node 20 resulting from the base/emitter voltage $V_{be}$ of the measuring transistor Q1 due to the excitation current $I_2$ being forced into the emitter of the measuring transistor Q1, $V_x[0]$ is the voltage at step zero on the non-inverting input 48 and the inverting input 49 of the op-amp 50, which is unknown, $V_{off}$ is the offset voltage of the op-amp 50 which when the CHOP signal is at logic low is assumed to be between a node 74 and the non-inverting input 48 of the op-amp, and when the CHOP signal is at logic high is assumed to be between a node 75 and the inverting input 49 of the op-amp 50, $V_{cm}$ is the voltage on the common mode output 60 of the op-amp 50, $V_{kp}$ is the coarse Kelvin correcting voltage applied to the capacitor $C_{k1}$, and $V_{kn}$ is the fine Kelvin correcting voltage applied to the capacitor $C_{k2}$.

Since the op-amp 50 is a differential amplifier, and assuming that the signal processing circuit 8 is a fully differential circuit, then the voltage outputs on the negative output 56 and the positive output 55 $V_{on}$ and $V_{op}$, respectively, are centred around the common mode voltage $V_{cm}$ on the common mode output 60. Thus, $$\frac{Vop[0] + Von[0]}{2} = Vcm = \frac{2Vx[0] + Voff}{2}$$

$$Von[0] = Vx[0] = Vcm - \frac{Voff}{2}$$

$$Vop[0] = Vx[0] + Voff = Vcm + \frac{Voff}{2}$$

Figure 5:
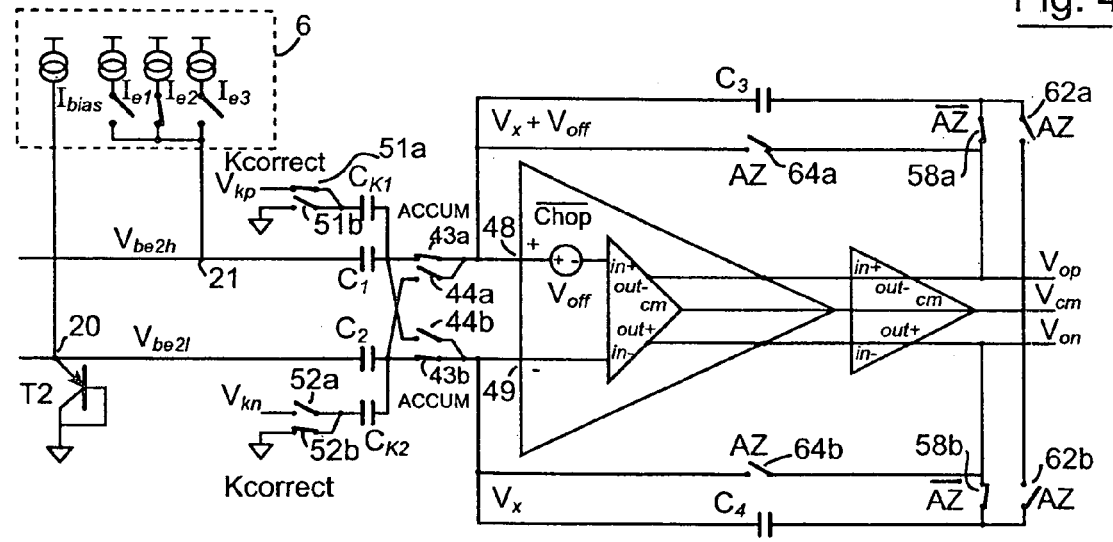

Referring now to FIG. 5, the state of the switches of the measuring circuit 5 during step 1 after auto-zeroing has been completed is illustrated. At the beginning of step 1 the AZ signal goes high and remains high for the rest of the measuring cycle, thus operating the switches 62a and 62b and 64a and 64b in the open circuit state, and operating the switches 58a and 58b in the closed circuit state. In this configuration the feedback capacitors $C_3$ and $C_4$ are connected respectively between the negative output 56 and the non-inverting input 48 and the positive output 55 and the inverting input 49, respectively, of the op-amp 50. The ACCUM/CHOP signal and the Kcorrect signals remain unaltered, and the current control signal S2 remains high, thus the excitation current $I_2$ is continuously forced into the emitter of the measuring transistor Q1. At this stage the charges on the capacitors at the end of step 1 is as follows:

$Qc1[1] = C1(Vbe2h - (Vx[1] + Voff))$ $Qc2[1] = C2(Vbe2l - Vx[1])$ $Qc3[1] = C3((Vx[1] + Voff) - Vop[1])$ $Qc4[1] = C4(Vx[1] - Von[1])$ $Qck1[1] = Ck1(Vkp - (Vx[1] + Voff))$ $Qck2[1] = Ck2(-Vx[1])$ The difference in the charges $\Delta Q$ on the respective capacitors between the end of step 0 and the end of step 1 is obtained by subtracting the previous charges at the end of step 0 from the current charges, and accordingly, the difference in charges on the capacitors at the end of step 1 is as follows:

$$\Delta Qc1[1]=C1(Vx[0]-Vx[1])$$

$$\Delta Qc2[1]=C2(Vx[0]-Vx[1])$$

$$\Delta Qc3[1]=C3((Vx[1]-Vx[0])+Vcm-Vop[1])$$

$$\Delta Qc4[1]=C4((Vx[1]-Vx[0])+Vcm-Von[1])$$

$$\Delta Qck1[1]=Ck1(Vx[0]-Vx[1])$$

$$\Delta Qck2[1]=Ck2(Vx[0]-Vx[1])$$

where $\Delta Q_{c1}[1]$ is the difference in charge on the capacitor $C_1$ between the end of step 0 and the end of step 1, and so on for the difference in charge on the capacitors $C_2$, $C_3$, $C_4$, $C_{k1}$ and $C_{k2}$.

Using Kirchoffs' Current Law and substituting in the charge difference equations above, the following expressions for $V_{on}$ and $V_{op}$ are obtained:

$$\Delta Qc2[1]+\Delta Qck2[1]=-\Delta Qc4[1],$$

which gives $$Von[1] = \frac{(C2 + Ck2)(Vx[0] - Vx[1])}{C4} + Vcm + (Vx[1] - Vx[0])$$

$$\Delta Qc1[1]+\Delta Qck1[1]=-\Delta Qc3[1],$$

which gives $$Vop[1] = \frac{(C1 + Ck1)(Vx[0] - Vx[1])}{C3} + Vcm + (Vx[1] - Vx[0])$$

It should be noted that at the end of step 1 the offset voltage $V_{off}$ of the op-amp 50 has been cancelled.

Since after auto-zeroing the voltages $V_{op}$ and $V_{on}$ are centred around the common mode voltage $V_{cm}$:

$$Vop[1] - Von[1] = 0$$

$$\frac{Vop[1] + Von[1]}{2} = Vcm,$$

which gives $$Von[1] = Vcm - \left(\frac{Vop[1] - Von[1]}{2}\right)$$

$$Vop[1]=Von[1]=Vcm$$

Figure 6:
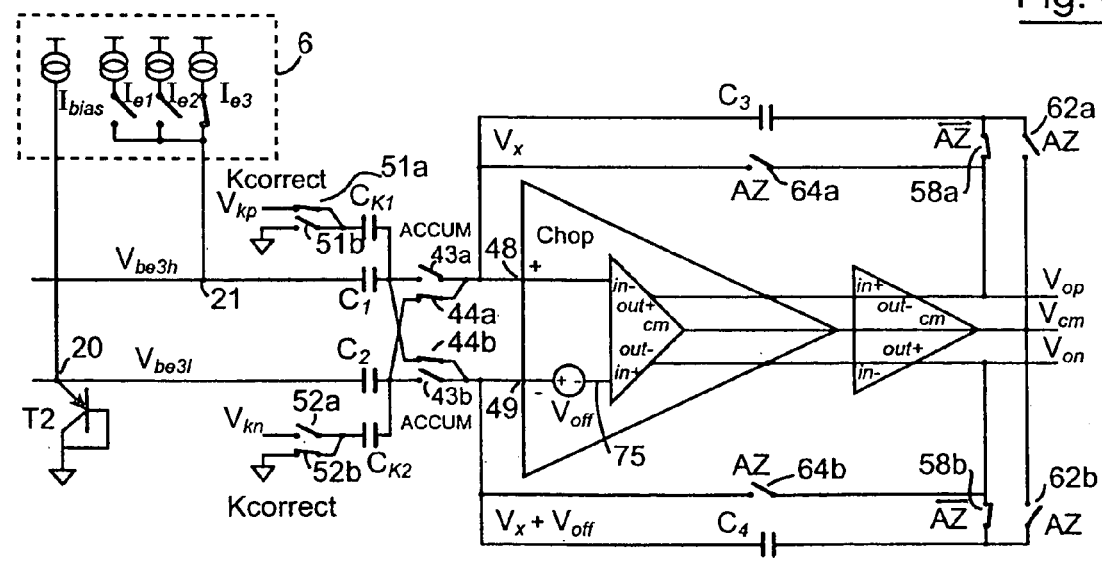

Referring now to FIG. 6, the state of switches in the measuring circuit 5 during step 2 is illustrated. The current control signals S1 and S2 are at logic low, while the current control signal S3 is at logic high, thus applying the excitation current $I_3$ to the measuring transistor Q1. The AZ signal remains at logic high, as does the Kcorrect signal. However, the ACCUM/CHOP signal is switched to logic high, thus coupling the input capacitors $C_1$ and $C_2$ to the inverting and non-inverting inputs 49 and 48, respectively, of the op-amp 50, and chopping the signals through the op-amp 50. Thus, at the end of step 2 the term $(V_{be2}-V_{be3})$, namely, the first term in the equation (19) is determined by the signal processing circuit 8.

The charges on the capacitors $C_1$, $C_2$, $C_3$, $C_4$, $C_{k1}$ and $C_{k2}$ at the end of step 2 is as follows:

$$Qc1[2]=C1(Vbe3h-(Vx[2]+Voff))$$

$$Qc2[2]=C2(Vbe3l-Vx[2])$$

$$Qc3[2]=C3(Vx[2]-Vop[2])$$

$$Qc4[2]=C4((Vx[2]+Voff)-Von[2])$$

$$Qck1[2]=Ck1(Vkp-(Vx[2]+Voff))$$

$$Qck2[2]=Ck2(-Vx[2])$$

where $V_{be3h}$ is the voltage on the sensing node 21 resulting from the base/emitter voltage $V_{be}$ of the measuring transistor Q1 due to the excitation current $I_3$ being forced into the emitter of the measuring transistor Q1, and $V_{be3l}$ is the voltage on the sensing node 20 resulting from the base/emitter voltage $V_{be3}$ of the measuring transistor Q1 due to the excitation current $I_3$ being forced into the measuring transistor Q1.

The difference in the charges on the capacitors $C_1$, $C_2$, $C_3$, $C_4$, $C_{k1}$ and $C_{k2}$ between the end of step 1 and the end of step 2 is given by the following expressions:

$$\Delta Qc1[2]=C1((Vbe3h-Vbe2h)+(Vx[1]-Vx[2]))$$

$$\Delta Qc2[2]=C2((Vbe3l-Vbe2l)+(Vx[1]-Vx[2]))$$

$$\Delta Qc3[2]=C3((Vx[2]-Vx[1])+(Vop[1]-Vop[2])-Voff)$$

$$\Delta Qc4[2]=C4((Vx[2]-Vx[1])+(Von[1]-Von[2])+Voff)$$

$$\Delta Qck1[2]=Ck1(Vx[1]-Vx[2])$$

$$\Delta Qck2[2]=Ck2(Vx[1]-Vx[2])$$

Accordingly, from the above expressions the following expressions can be derived:

$$\Delta Qc1[2]+\Delta Qck1[2]=-\Delta Qc4[2],$$

which gives $$Von[2] = \frac{C1(Vbe3h - Vbe2h) + (C1 + Ck1)(Vx[1] - Vx[2])}{C4} + Von[1] + (Vx[2] - Vx[1]) + Voff$$

$$\Delta Qc2[2]+\Delta Qck2[2]=-\Delta Qc3[2],$$

which gives $$Vop[2] = \frac{C2(Vbe3l - Vbe2l) + (C2 + Ck2)(Vx[1] - Vx[2])}{C3} + Vop[1] + (Vx[2] - Vx[1]) - Voff$$

From the above expressions $V_{op}$ and $V_{on}$ can be derived:

Since $C_1=C_2$, if $C_{in}=C_1=C_2$, and since $C_3=C_4$, if $C_f=C_3=C_4$, then:

$$Vop[2] - Von[2] = -\left(\frac{Cin}{Cf}((Vbe3h - Vbe3l) - (Vbe2h - Vbe2l)) + 2Voff\right)$$

$$\frac{Vop[2] + Von[2]}{2} = Vcm,$$

which gives $$Von[2] = Vcm - \left(\frac{Vop[2] - Von[2]}{2}\right),$$

which gives $$Vop[2] = Vcm + \left(\frac{Vop[2] - Von[2]}{2}\right)$$

$$Vop[2] = Vcm - \left(\frac{Cin}{2Cf}((Vbe3h - Vbe3l) - (Vbe2h - Vbe2l)) + Voff\right)$$

$$Von[2] = Vcm + \left(\frac{Cin}{2Cf}((Vbe3h - Vbe3l) - (Vbe2h - Vbe2l)) + Voff\right)$$

At the end of step 2 the offset voltage $V_{off}$ of the op-amp 50 has reappeared.

Accordingly, at the end of step 2 the first term $(V_{be2}-V_{be3})$ of equation (19) has been obtained, and the differential output $V_{op}-V_{on}$ of the op-amp 50 includes the term $(V_{be2}-V_{be3})$ of equation (19), see waveform 82 of FIG. 3.

Figure 7:
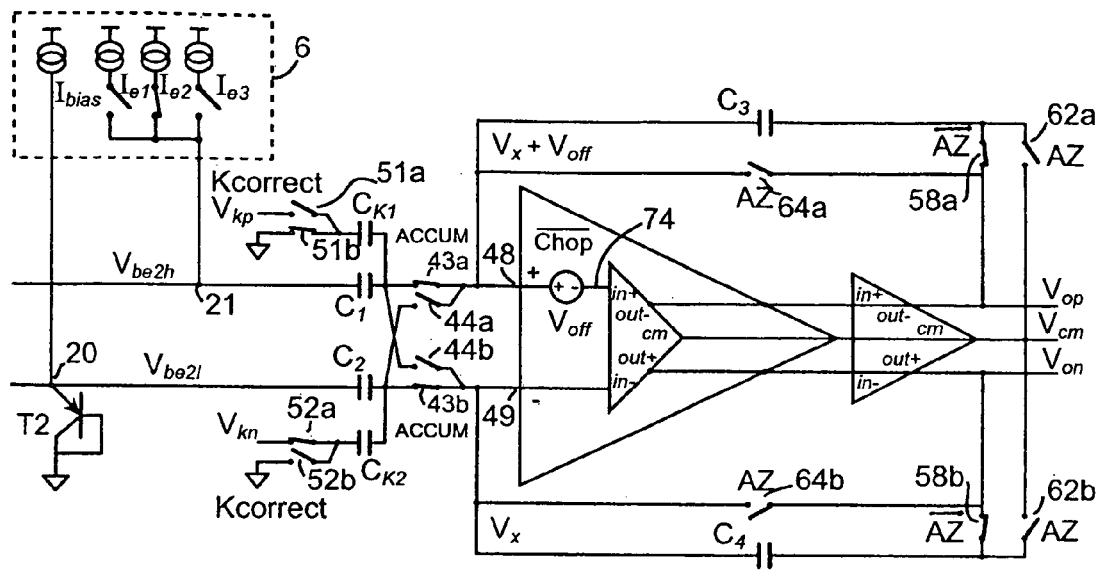

Referring now to FIG. 7, the state of the switches of the measuring circuit 5 during step 3 is illustrated. The current control signals S1 and S3 are at logic low and the current control signal S2 is at logic high, thus forcing the excitation current $I_2$ into the emitter of the measuring transistor Q1. The AZ signal remains at logic high, the ACCUM/CHOP signal is returned to logic low and the Kcorrect signal is set at logic low.

Accordingly, the charges on the capacitors $C_1$, $C_2$, $C_3$, $C_4$, $C_{k1}$ and $C_{k2}$ at the end of step 3 are as follows:

$$Qc1[3]=C1(Vbe2h-(Vx[3]+Voff))$$

$$Qc2[3]=C2(Vbe2l-Vx[3])$$

$$Qc3[3]=C3((Vx[3]+Voff)-Vop[3])$$

$$Qc4[3]=C4(Vx[3]-Von[3])$$

$$Qck1[3]=Ck1(-(Vx[3]+Voff))$$

$$Qck2[3]=Ck2(Vkn-Vx[3])$$

The difference between the charges on the capacitors $C_1$ through to $C_{k2}$ between the end of step 2 and step 3 is given by the following expressions:

$$\Delta Qc1[3]=C1((Vbe2h-Vbe3h)+(Vx[2]-Vx[3]))$$

$$\Delta Qc2[3]=C2((Vbe2l-Vbe3l)+(Vx[2]-Vx[3]))$$

$$\Delta Qc3[3]=C3((Vx[3]-Vx[2])+(Vop[2]-Vop[3])+Voff)$$

$$\Delta Qc4[3]=C4((Vx[3]-Vx[2])+(Von[2]-Von[3])-Voff)$$

$$\Delta Qck1[3]=Ck1(-Vkp+(Vx[2]-Vx[3]))$$

$$\Delta Qck2[3]=Ck2(Vkn+(Vx[2]-Vx[3]))$$

Thus, the following expressions can be derived from the above expressions:

$$\Delta Qc2[3]+\Delta Qck2[3]=-\Delta Qc4[3],$$

which gives $$Von[3] = \frac{C2(Vbe2l - Vbe3l) + Ck2(Vkn) + (C2 + Ck2)(Vx[2] - Vx[3])}{C4} +$$
$$Von[2] + (Vx[3] - Vx[2]) - Voff$$

$$\Delta Qc1[3]+\Delta Qck1[3]=-\Delta Qc3[3]$$

which gives $$Vop[3] = \frac{C1(Vbe2h - Vbe3h) + Ck1(-Vkp) + (C1 + Ck1)(Vx[2] - Vx[3])}{C3} +$$
$$Vop[2] + (Vx[3] - Vx[2]) + Voff$$

Thus, from the values of $V_{op}[3]$ and $V_{on}[3]$ above, and since $C_1=C_2=C_{in}$ and $C_3=C_4=C_f$, the following expressions for the voltages $V_{op}$ and $V_{on}$ on the positive and negative outputs 55 and 56, respectively, of the op-amp 50 can be derived:

$$Vop[3] - Von[3] =$$
$$-\left(\frac{Cin}{Cf}(2(Vbe3h - Vbe3l) - 2(Vbe2h - Vbe2l)) + \frac{Ck}{Cf}(Vkp + Vkn)\right)$$

$$\frac{Vop[3] + Von[3]}{2} = Vcm,$$

which gives $$Von[3] = Vcm - \left(\frac{Vop[3] - Von[3]}{2}\right),$$

which gives $$Vop[3] = Vcm + \left(\frac{Vop[3] - Von[3]}{2}\right)$$

$$Vop[3] =$$
$$Vcm - \left(\frac{Cin}{2Cf}(2(Vbe3h - Vbe3l) - 2(Vbe2h - Vbe2l)) + \frac{Ck}{2Cf}(Vkp + Vkn)\right)$$

$$Von[3] = Vcm +$$
$$\left(\frac{Cin}{2Cf}(2(Vbe3h - Vbe3l) - 2(Vbe2h - Vbe2l)) + \frac{Ck}{2Cf}(Vkp + Vkn)\right)$$

From the above it can be seen that the voltages $V_{op}[3]$ and $V_{op}[3]$ on the positive and negative outputs 55 and 56, respectively, of the op-amp 50 include Kelvin correcting voltages $V_{kp}$ and $V_{kn}$; however, the offset voltage $V_{off}$ of the op-amp 50 has again disappeared from the expressions.

At this stage, the second term, namely $(V_{be3}-V_{be2})$, of equation (19) has been derived, and has been subtracted from the first term $(V_{be2}-V_{be3})$. Accordingly, the differential output voltage $V_{op}-V_{on}$ of the op-amp 50 at the end of step 3 includes the terms $(V_{be2}-V_{be3})-(V_{be3}-V_{be2})$ of equation (19), see waveform 82 of FIG. 3.

Figure 8:
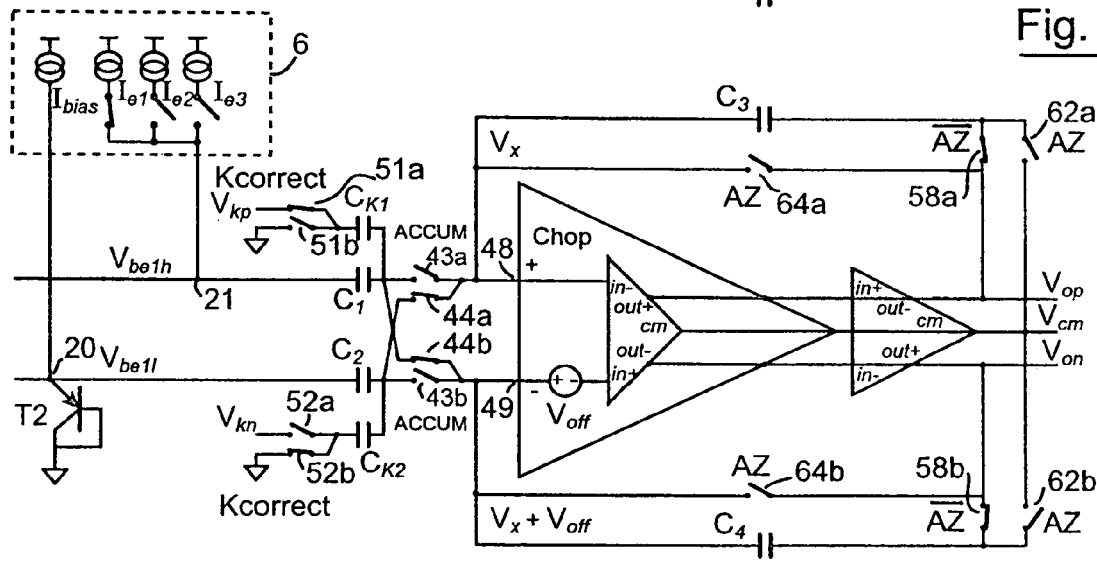

Referring now to FIG. 8, the state of the switches in the measuring circuit during step 4 is illustrated. The current control signals S2 and S3 are at logic low and the current control signal S1 is at logic high, thus forcing the excitation current $I_1$ into the emitter of the measuring transistor Q1. The AZ signal is held at logic high, and the ACCUM/CHOP signal and the Kcorrect signal are switched to logic high.

At the end of step 4 the charges on the capacitors $C_1$ through to $C_{k2}$ are as follows:

$$Qc1[4]=C1(Vbe1h-(Vx[4]+Voff))$$

$$Qc2[4]=C2(Vbe1l-Vx[4])$$

$$Qc3[4]=C3(Vx[4]-Vop[4])$$

$$Qc4[4]=C4((Vx[4]+Voff)-Von[4])$$

$$Qck1[4]=Ck1(Vkp-(Vx[4]+Voff))$$

$$Qck2[4]=Ck2(-Vx[4])$$

The difference in the charges on the capacitors $C_1$ through to $C_{k2}$ between the end of step 3 and the end of step 4 are given by the expressions:

$$\Delta Qc1[4]=C1((Vbe1h-Vbe2h)+(Vx[3]-Vx[4]))$$

$$\Delta Qc2[4]=C2((Vbe1l-Vbe2l)+(Vx[3]-Vx[4]))$$

$$\Delta Qc3[4]=C3((Vx[4]-Vx[3])+(Vop[3]-Vop[4])-Voff)$$

$$\Delta Qc4[4]=C4((Vx[4]-Vx[3])+(Von[3]-Von[4])+Voff)$$

$$\Delta Qck1[4]=Ck1(Vkp+(Vx[3]-Vx[4]))$$

$$\Delta Qck2[4]=Ck2(-Vkn+(Vx[3]-Vx[4]))$$

where $V_{be1h}$ is the voltage on the sensing node 21 resulting from the base/emitter voltage of the measuring transistor Q1 due to the excitation current $I_1$ being forced into the emitter of the measuring transistor Q1, $V_{be1l}$ is the voltage on the sensing node 20 resulting from the base/emitter voltage $V_{be}$ of the measuring transistor Q1 due to the excitation current $I_1$ being forced into the emitter of the measuring transistor Q1.

Thus, the following expressions can be derived from the above expressions:

$$\Delta Qc1[4]+\Delta Qck1[4]=-\Delta Qc4[4],$$

which gives $$Von[4] = \frac{C1(Vbe1h - Vbe2h) + Ck1(Vkp) + (C1 + Ck1)(Vx[3] - Vx[4])}{C4} + Von[3] + (Vx[4] - Vx[3]) + Voff$$

$$\Delta Qc2[4]+\Delta Qck2[4]=-\Delta Qc3[4],$$

which gives $$Vop[4] = \frac{C2(Vbe1l - Vbe2l) + Ck2(-Vkn) + (C2 + Ck2)(Vx[3] - Vx[4])}{C3} + Vop[3] + (Vx[4] - Vx[3]) - Voff$$

From the above, and since $C_1=C_2=C_{in}$, and since $C_3=C_4=C_f$, the voltages $V_{op}$ and $V_{on}$ on the positive and negative outputs 55 and 56 of the op-amp 50 can be derived as follows:

$$Vop[4] - Von[4] = \\ -\left(\frac{Cin}{Cf}(2(Vbe3h - Vbe3l) - 3(Vbe2h - Vbe2l) + (Vbe1h - Vbe1l)) + \\ \frac{2Ck}{Cf}(Vkp + Vkn) - 2Voff\right)$$

$$\frac{Vop[4] + Von[4]}{2} = Vcm,$$

which gives $$Von[4] = Vcm - \left(\frac{Vop[4] - Von[4]}{2}\right),$$

which gives $$Vop[4] = Vcm + \left(\frac{Vop[4] - Von[4]}{2}\right)$$

$$Vop[4] = \\ Vcm - \left(\frac{Cin}{2Cf}(2(Vbe3h - Vbe3l) - 3(Vbe2h - Vbe2l) + (Vbe1h - Vbe1l)) + \\ \frac{Ck}{Cf}(Vkp + Vkn) - Voff\right)$$

$$Von[4] = Vcm + \left(\frac{Cin}{2Cf}(2(Vbe3h - Vbe3l) - 3(Vbe2h - Vbe2l) + \\ (Vbe1h - Vbe1l)) + \frac{Ck}{Cf}(Vkp + Vkn) - Voff\right)$$

As can be seen, the voltages $V_{op}[4]$ and $V_{on}[4]$ at the end of step 4 on the positive and negative outputs 55 and 56, respectively, of the op-amp 50 each include the Kelvin correcting voltages $V_{kp}$ and $V_{kn}$, and also the offset voltage $V_{off}$. At this stage the third term $(V_{be2}-V_{be1})$ of equation (19) has been derived and added to the difference of the first and second terms of equation (19). Thus, at the end of step 4 the differential output $V_{op}-V_{on}$ of the op-amp 50 includes the terms $(V_{b2}-V_{be3})-(V_{be3}-V_{be2})+(V_{be2}-V_{be1})$ of equation (19), see waveform 82 of FIG. 3.

Figure 9:
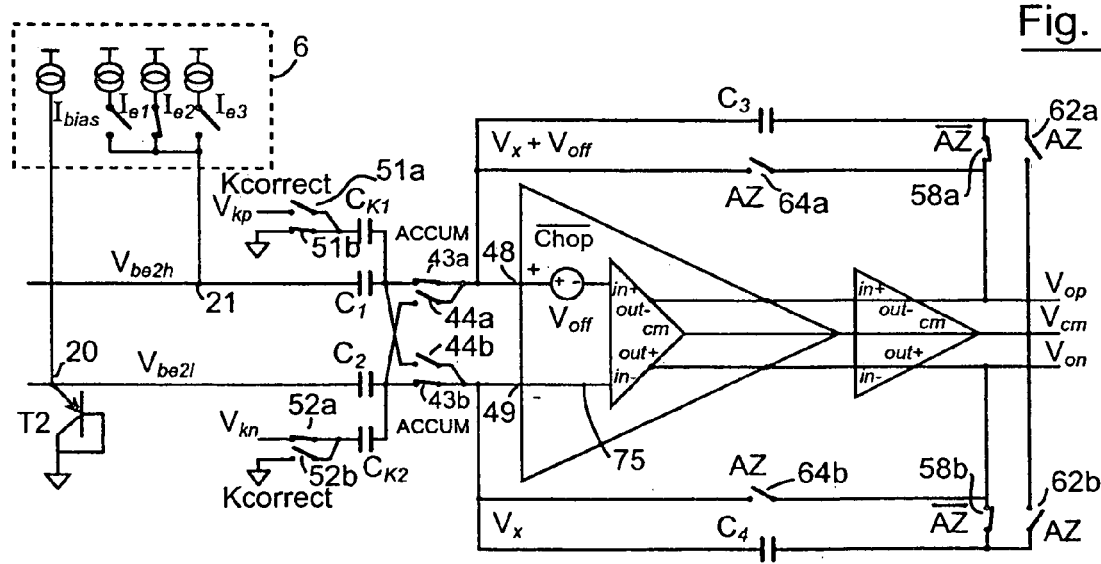

Referring now to FIG. 9, the state of the switches in the measuring circuit 5 during step 5 is illustrated. The current control signal S2 is set at logic high, while the current control signals S1 and S3 are held at logic low. Thus, the excitation current $I_2$ is forced into the emitter of the measuring transistor Q1. The AZ signal remains at logic high, and the ACCUM/CHOP signal and the Kcorrect signal are switched to logic low.

At the end of step 5 the charges on the capacitors $C_1$ through to $C_{k2}$ are given by the following expressions:

$$Qc1[5]=C1(Vbe2h-(Vx[5]+Voff))$$

$$Qc2[5]=C2(Vbe2l-Vx[5])$$

$$Qc3[5]=C3((Vx[5]+Voff)-Vop[5])$$

$$Qc4[5]=C4(Vx[5]-Von[5])$$

$Qck1[5]=Ck1(-(Vx[5]+Voff))$ $Qck2[5]=Ck2(Vkn-Vx[5])$

The difference between the charges on the capacitors $C_1$ through to $C_{k2}$ between the end of step 4 and the end of step 5 are given by the following expressions:

$\Delta Qc1[5]=C1((Vbe2h-Vbe1h)+(Vx[4]-Vx[5]))$ $\Delta Qc2[5]=C2((Vbe2l-Vbe1l)+(Vx[4]-Vx[5]))$ $\Delta Qc3[5]=C3((Vx[5]-Vx[4])+(Vop[4]-Vop[5])+Voff)$ $\Delta Qc4[5]=C4((Vx[5]-Vx[4])+(Von[4]-Von[5])-Voff)$ $\Delta Qck1[5]=Ck1(-Vkp+(Vx[4]-Vx[5]))$ $\Delta Qck2[5]=Ck2(Vkn+(Vx[4]-Vx[5]))$ From the above, the following expressions can be derived:

$\Delta Qc2[5]+\Delta Qck2[5]=-\Delta Qc4[5]$ which gives $$Von[5] = \frac{C2(Vbe2l-Vbe1l)+Ck2(Vkn)+(C2+Ck2)(Vx[4]-Vx[5])}{C4} +$$
$$Von[4]+(Vx[5]-Vx[4])-Voff$$

$\Delta Qc1[5]+\Delta Qck1[5]=-\Delta Qc3[5]$, which gives $$Vop[5] = \frac{C1(Vbe2h-Vbe1h)+Ck1(-Vkp)+(C1+Ck1)(Vx[4]-Vx[5])}{C3} +$$
$$Vop[4]+(Vx[5]-Vx[4])+Voff$$

From the above, and since $C_1=C_2=C_{in}$ and $C_3=C_4=C_f$, the values of $V_{op}[5]$ and $V_{on}[5]$, namely, the voltages on the positive and negative outputs 55 and 56, respectively, of the op-amp 50 can be derived as follows:

$Vop[5] - Von[5] =$ $$-\left(\frac{Cin}{Cf}(2(Vbe3h-Vbe3l)-4(Vbe2h-Vbe2l)+2(Vbe1h-Vbe1l))+\right.$$
$$\left.\frac{3Ck}{Cf}(Vkp+Vkn)\right)$$

$\frac{Vop[5]+Von[5]}{2} = Vcm,$ which gives $Von[5] = Vcm - \left(\frac{Vop[5]-Von[5]}{2}\right),$ which gives $Vop[5] = Vcm + \left(\frac{Vop[5]-Von[5]}{2}\right)$ $Vop[5] =$ -continued $$Vcm - \left(\frac{Cin}{2Cf}(2(Vbe3h-Vbe3l)-4(Vbe2h-Vbe2l)+2(Vbe1h-Vbe1l))+\right.$$
$$\left.\frac{3Ck}{2Cf}(Vkp+Vkn)\right)$$

$$Von[5] = Vcm + \left(\frac{Cin}{2Cf}(2(Vbe3h-Vbe3l)-4(Vbe2h-Vbe2l)+\right.$$
$$\left.2(Vbe1h-Vbe1l))+\frac{3Ck}{2Cf}(Vkp+Vkn)\right)$$

It can be seen that the above values of $V_{op}[5]$ and $V_{on}[5]$ include the Kelvin correcting voltages $V_{kp}$ and $V_{kn}$, however, the offset voltage $V_{off}$ of the op-amp has again disappeared.

At the end of step 5 the fourth term $(V_{be1}-V_{be2})$ of equation (19) has been derived, and has been subtracted from the difference of the first and second terms and the sum of the third term. Thus, the differential output $V_{op}-V_{on}$ of the op-amp 50 at the end of step 5 includes the terms $(V_{be2}-V_{be3})-(V_{be3}-V_{be2})+(V_{be2}-V_{be1})-(V_{be1}-V_{be2})$ of equation (19), see waveform 82 of FIG. 3.

Figure 10:
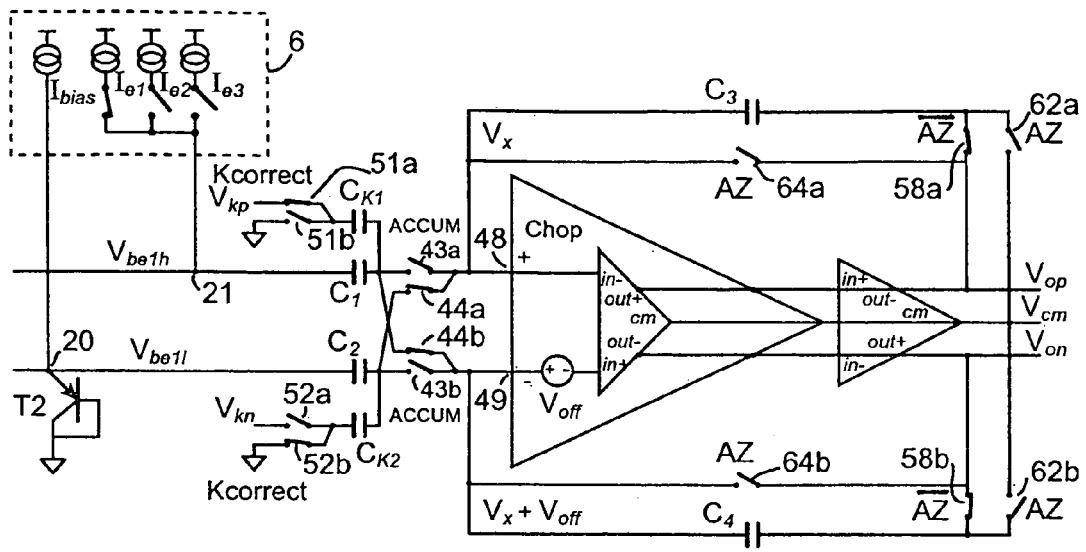

Referring now to FIG. 10, the state of the switches in the measuring circuit 5 during step 6 is illustrated. The current control signals S2 and S3 are held at logic low, while the current control signal S1 is at logic high, thus forcing the current $I_1$ into the emitter of the measuring transistor Q1. The AZ signal is held at logic high, while the ACCUM/CHOP signal and the Kcorrect signal are switched to logic high.

At the end of step 6 the charges on the capacitors $C_1$ through to $C_{k2}$ are given by the following expressions:

$Qc1[6]=C1(Vbe1h-(Vx[6]+Voff))$ $Qc2[6]=C2(Vbe1l-Vx[6])$ $Qc3[6]=C3(Vx[6]-Vop[6])$ $Qc4[6]=C4((Vx[6]+Voff)-Von[6])$ $Qck1[6]=Ck1(Vkp-(Vx[6]+Voff))$ $Qck2[6]=Ck2(-Vx[6])$ From the above, the difference of the charges on the capacitors $C_1$ through to $C_{k2}$ between the end of step 5 and the end of step 6 is given by the following expressions:

$\Delta Qc1[6]=C1((Vbe1h-Vbe2h)+(Vx[5]-Vx[6]))$ $\Delta Qc2[6]=C2((Vbe1l-Vbe2l)+(Vx[5]-Vx[6]))$ $\Delta Qc3[6]=C3((Vx[6]-Vx[5])+(Vop[5]-Vop[6])-Voff)$ $\Delta Qc4[6]=C4((Vx[6]-Vx[5])+(Von[5]-Von[6])+Voff)$ $\Delta Qck1[6]=Ck1(Vkp+(Vx[5]-Vx[6]))$ $\Delta Qck2[6]=Ck2(-Vkn+(Vx[5]-Vx[6]))$ The following expressions can be derived from the above expressions:

$\Delta Qc1[6]+\Delta Qck1[6]=-\Delta Qc4[6]$, which gives $$Von[6] = \frac{C1(Vbe1h - Vbe2h) + Ck1(Vkp) + (C1 + Ck1)(Vx[5] - Vx[6])}{C4} +$$
$$Von[5] + (Vx[6] - Vx[5]) + Voff$$

$\Delta Qc2[6] + \Delta Qck2[6] = -\Delta Qc3[6]$ which gives $$Vop[6] = \frac{C2(Vbe1l - Vbe2l) + Ck2(-Vkn) + (C2 + Ck2)(Vx[5] - Vx[6])}{C3} +$$
$$Vop[5] + (Vx[6] - Vx[5]) - Voff$$

From the above expressions, and since $C_1=C_2=C_{in}$ and $C_3=C_4=C_f$, the values of $V_{op}[6]$ and $V_{on}[6]$, namely, the output voltage $V_{op}$ and $V_{on}$ on the positive and negative outputs 55 and 56, respectively, of the op-amp 50 at the end of step 6 can be derived.

$$Vop[6] - Von[6] =$$
$$-\left(\frac{Cin}{Cf}(2(Vbe3h - Vbe3l) - 5(Vbe2h - Vbe2l) + 3(Vbe1h - Vbe1l)) + \frac{4Ck}{Cf}(Vkp + Vkn) - 2Voff\right)$$

$$\frac{Vop[6] + Von[6]}{2} = Vcm,$$

which gives $$Von[6] = Vcm - \left(\frac{Vop[6] - Von[6]}{2}\right),$$

which gives $$Vop[6] = Vcm + \left(\frac{Vop[6] - Von[6]}{2}\right)$$
$$Vop[6] =$$
$$Vcm - \left(\frac{Cin}{2Cf}(2(Vbe3h - Vbe3l) - 5(Vbe2h - Vbe2l) + 3(Vbe1h - Vbe1l)) + \frac{2Ck}{Cf}(Vkp + Vkn) - Voff\right)$$
$$Von[6] = Vcm + \left(\frac{Cin}{2Cf}(2(Vbe3h - Vbe3l) - 5(Vbe2h - Vbe2l) + 3(Vbe1h - Vbe1l)) + \frac{2Ck}{Cf}(Vkp + Vkn) - Voff\right)$$

At this stage, the values of the output voltage $V_{op}$ and $V_{on}$ on the positive and negative outputs 55 and 56, respectively, of the op-amp 50 each include the Kelvin correcting voltages $V_{kp}$ and $V_{kn}$, and the offset voltage $V_{off}$ of the op-amp has returned.

At the end of step 6 the fifth term $(V_{be2}-V_{be1})$ of equation (19) has been derived, and has been added to the sum of the difference of the first and the second terms, the difference of the third and the fourth terms. Thus, the differential output $V_{op}-V_{on}$ of the op-amp 50 at the end of step 6 includes the terms $(V_{be2}-V_{be3})-(V_{be3}-V_{be2})+(V_{be2}-V_{be1})-(V_{be1}-V_{be2})+(V_{be2}-V_{be1})$ of equation (19), see the waveform 82 of FIG. 3.

Figure 11:
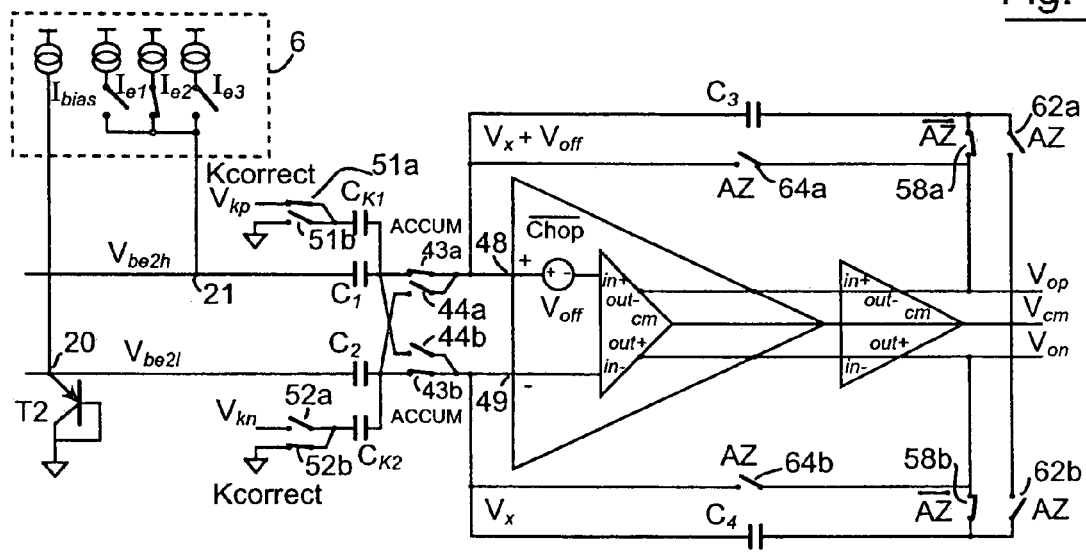

Referring now to FIG. 11, the state of the switches of the measuring circuit 5 during step 7 is illustrated. The current control signals S1 and S3 are held at logic low, and the current control signal S2 is set at logic high, thus forcing the excitation current $I_2$ into the emitter of the measuring transistor Q1. The AZ signal remains at logic high, and the ACCUM/CHOP signal goes to logic low, while the Kcorrect signal remains at logic high.

The charges on the capacitors $C_1$ through to $C_{k2}$ at the end of step 7 are given by the following expressions:

$Qc1[7]=C1(Vbe2h-(Vx[7]+Voff))$ $Qc2[7]=C2(Vbe2l-Vx[7])$ $Qc3[7]=C3((Vx[7]+Voff)-Vop[7])$ $Qc4[7]=C4(Vx[7]-Von[7])$ $Qck1[7]=Ck1(Vkp-(Vx[7]+Voff))$ $Qck2[7]=Ck2(-Vx[7])$ The difference in the charges on the capacitors $C_1$ through to $C_{k2}$ between the end of step 6 and the end of step 7 are given by the following expressions:

$\Delta Qc1[7]=C1((Vbe2h-Vbe1h)+(Vx[6]-Vx[7]))$ $\Delta Qc2[7]=C2((Vbe2l-Vbe1l)+(Vx[6]-Vx[7]))$ $\Delta Qc3[7]=C3((Vx[7]-Vx[6])+(Vop[6]-Vop[7])+Voff)$ $\Delta Qc4[7]=C4((Vx[7]-Vx[6])+(Von[6]-Von[7])-Voff)$ $\Delta Qck1[7]=Ck1(Vx[6]-Vx[7])$ $\Delta Qck2[7]=Ck2(Vx[6]-Vx[7])$ from which the following expressions can be derived:

$\Delta Qc2[7]+\Delta Qck2[7]=-\Delta Qc4[7]$, which gives $$Vop[7] = \frac{C2(Vbe2l - Vbe1l) + (C2 + Ck2)(Vx[6] - Vx[7])}{C4} +$$
$$Von[6] + (Vx[7] - Vx[6]) - Voff$$

$\Delta Qc1[7]+\Delta Qck1[7]=-\Delta Qc3[7]$ which gives $$Vop[7] = \frac{C1(Vbe2h - Vbe1h) + (C1 + Ck1)(Vx[6] - Vx[7])}{C3} +$$
$$Vop[6] + (Vx[7] - Vx[6]) + Voff$$

Since $C_1=C_2=C_{in}$ and $C_3=C_4=C_f$, the voltages $V_{op}[7]$ and $V_{on}[7]$ on the positive and negative outputs 55 and 56, respectively, of the op-amp 50 at the end of step 7 can be derived from the above expressions as follows:

$$Vop[7] - Von[7] =$$
$$-\left(\frac{Cin}{Cf}(2(Vbe3h - Vbe3l) - 6(Vbe2h - Vbe2l) + 4(Vbe1h - Vbe1l)) + \frac{4Ck}{Cf}(Vkp + Vkn)\right)$$

$$\frac{Vop[7] + Von[7]}{2} = Vcm,$$

which gives $$Von[7] = Vcm - \left(\frac{Vop[7] - Von[7]}{2}\right),$$

which gives $$Vop[7] = Vcm + \left(\frac{Vop[7] - Von[7]}{2}\right)$$
$$Vop[7] =$$
$$Vcm - \left(\frac{Cin}{2Cf}(2(Vbe3h - Vbe3l) - 6(Vbe2h - Vbe2l) + 4(Vbe1h - Vbe1l)) + \frac{2Ck}{Cf}(Vkp + Vkn)\right)$$

$$Von[7] = Vcm + \left(\frac{Cin}{2Cf}(2(Vbe3h - Vbe3l) - 6(Vbe2h - Vbe2l) + 4(Vbe1h - Vbe1l)) + \frac{2Ck}{Cf}(Vkp + Vkn)\right)$$

At this stage the output voltages $V_{op}[7]$ and $V_{on}[7]$ on the positive and negative outputs 55 and 56, respectively, of the op-amp 50 at the end of step 7 contain the Kelvin correcting voltages $V_{kp}$ and $V_{kn}$, and the output voltages $V_{op}[7]$ and $V_{on}[7]$ are fully corrected with the temperature correcting voltages. However, as can be seen, the offset voltage of the op-amp 50 has disappeared from the two expressions, and accordingly, has no effect on the output voltages $V_{op}[7]$ and $V_{on}[7]$ on the positive and negative outputs 55 and 56, respectively, of the op-amp 50.

At this stage the sixth and last term of equation (19), namely, $(V_{be1}-V_{be2})$ has been derived, and subtracted from the fifth term, which had been summed with the sum of the difference of the first and second terms and the difference of the third and fourth terms. Accordingly, the differential output voltage $V_{op}-V_{on}$ of the op-amp 50 at the end of step 7 includes all the terms of equation (19), namely:

$(V_{be2}-V_{be3})-(V_{be3}-V_{be2})+(V_{be2}-V_{be1})-(V_{be1}-Vbe2)+$
$(Vbe2-Vbe1)-(Vbe1-Vbe2).$

In other words, the differential output voltage $V_{op}-V_{on}$ of the op-amp 50 is equal to:

$4\Delta V_{be21}(T)-2\Delta V_{be32}(T),$ and is thus indicative of the temperature of the measuring transistor Q1.

The next period in the measuring cycle continues, during which the excitation currents are applied to the measuring transistor Q1, again in the predetermined current sequence, and the next step in the measuring cycle is identical to step 2, which has already been described, and the excitation current $I_3$ is forced into the emitter of the measuring transistor Q1, and so on until the excitation currents have been applied to the measuring transistor Q1 in the predetermined current sequence four times.

After the predetermined current sequence has been applied to the measuring transistor Q1 four times, the voltage difference of the voltages $V_{op}$ and $V_{on}$ on positive and negative outputs 55 and 56 of the op-amp 50 is given by the expression:

$$Vop - Von = -4\left(\frac{Cin}{Cf}(2(Vbe3h - Vbe3l) - 6(Vbe2h - Vbe2l) + 4(Vbe1h - Vbe1l)) + \frac{4Ck}{Cf}(Vkp + Vkn)\right) \quad (20)$$

where $C_{in}=C_1=C_2$ and $C_f=C_3=C_4$.

The voltage on the positive output 55 $V_{op}$ is given by the expression:

$$Vop = Vcm + \left(\frac{4Cin}{Cf}(2(Vbe2 - Vbe1) - (Vbe3 - Vbe2)) + \frac{-8Ck}{Cf}(Vkp + Vkn)\right) \quad (21)$$

and the voltage on the negative output 56 of the op-amp 50 is given by the expression:

$$Von = Vcm - \left(\frac{4Cin}{Cf}(2(Vbe2 - Vbe1) - (Vbe3 - Vbe2)) + \frac{-8Ck}{Cf}(Vkp + Vkn)\right) \quad (22)$$

Thus, the differential output voltage of the operational amplifier 50 resulting from the application of the excitation currents $I_1$, $I_2$ and $I_3$ to the measuring transistor Q1 at the end of each predetermined current sequence which is indicative of the temperature of the measuring transistor Q1 is compounded with each subsequent application of the excitation currents to the measuring transistor Q1 in the predetermined current sequence in each measuring cycle, thereby increasing the voltage change in the differential output voltage of the op-amp 50 per degree change in temperature of the measuring transistor Q1. By increasing the number of applications of the excitation currents $I_1$, $I_2$ and $I_3$ to the measuring transistor Q1 in the predetermined current sequence in each measuring cycle, the voltage change in the differential output voltage of the op-amp 50 per degree change in temperature of the measuring transistor Q1 is increased. However, the maximum number of applications of the excitation currents $I_1$, $I_2$ and $I_3$ to the measuring transistor Q1 in the predetermined current sequence in each measuring cycle will be limited by the voltage headroom of the op-amp.

From equation (16), equation (20) can be written as:

$$Vop - Von = 8\frac{Cin}{Cf}\frac{kT}{q}\ln\left(\frac{a^{(M+N)}}{b^N}\right) - 16\frac{Ck}{Cf}(Vkp + Vkn)$$

Accordingly, the voltage on the positive output 55 of the op-amp 50 $V_{op}$ is given by the following expression:

$$Vop = Vcm + \left(4\frac{C_{in}}{C_f}\frac{kT}{q}\ln\left(\frac{a^{(M+N)}}{b^N}\right) - 8\frac{Ck}{Cf}(Vkp + Vkn)\right)$$

and the voltage on the negative output 55 of the op-amp 50 $V_{on}$ is given by the expression:

$$Von = Vcm - \left(4\frac{C_{in}}{C_f}\frac{kT}{q}\ln\left(\frac{a^{(M+N)}}{b^N}\right) - 8\frac{Ck}{Cf}(Vkp + Vkn)\right)$$

In this embodiment of the invention, the capacitance $C_{in}$ of the input capacitors $C_1$ and $C_2$ and the capacitance $C_f$ of the feedback capacitors $C_3$ and $C_4$ have been selected so that the ratio of the capacitance $C_{in}$ to the capacitance $C_f$ is 5.

The value of the capacitance Ck of the Kelvin offset correction capacitors $C_{k1}$ and $C_{k2}$ in this embodiment of the invention is chosen so that the ratio of the capacitance $C_k$ to the capacitance $C_f$ of the feedback capacitors $C_3$ and $C_4$ is one-eighth. The values of the coarse and fine Kelvin correcting voltages $V_{kp}$ and $V_{kn}$ are chosen so that the expression $$16\frac{Ck}{Cf}(Vkp + Vkn)$$

provides the desired offset voltage for the differential output voltage from the op-amp 50, so that a differential output voltage of zero volts from the op-amp 50 corresponds to the temperature of the measuring transistor Q1 when it is at the lowest temperature value of the theoretical temperature range over which the temperature sensing circuit 1 is to be operational. The choice of the value for the coarse and fine Kelvin correcting voltages $V_{kp}$ and $V_{kn}$ in general will be limited due to circuit factors of the measuring circuit 5, such as, for example, matching of the performance of resistors of the measuring circuit, immunity from noise, and the ability to trim the values if required. This will be appreciated by those skilled in the art.

In this embodiment of the invention the current $I_1$ has been selected to be of 6 μamps. By so selecting the current $I_1$, it has been found that the voltages resulting from the integration of the voltage differences of the base/emitter voltages of the measuring transistor Q1 resulting from excitation of the measuring transistor Q1 by the excitation currents $I_1$, $I_2$ and $I_3$ in the respective predetermined current sequence for the four applications of the excitation currents in the predetermined sequence of each measuring cycle are maintained well within the voltage headroom of the op-amp. Thus, the differential output voltage of the op-amp 50 at the end of each measuring cycle is indicative of the temperature of the measuring transistor Q1.

Additionally, since the effect of the current path series resistance on the output voltage from the op-amp 50 is eliminated, voltages resulting from the line series resistance on the sensing nodes 20 and 21 have no effect on the output voltage of the op-amp 50, and therefore, line series resistance in the current path can be tolerated. This has two particularly important advantages. Firstly, the measuring transistor Q1 may be located at a considerable distance from the measuring circuit, and coupled to the measuring circuit by only two wires, and secondly, a resistive filter can be located in the current path between the measuring transistor Q1 and the measuring circuit 5 for filtering the base/emitter voltages from the measuring transistor Q1 to the signal processing circuit 8 without having any adverse effect on the output voltage of the op-amp 50. This advantage of the invention is discussed in detail with reference to a temperature sensing circuit described with reference to FIG. 15.

Figure 12:
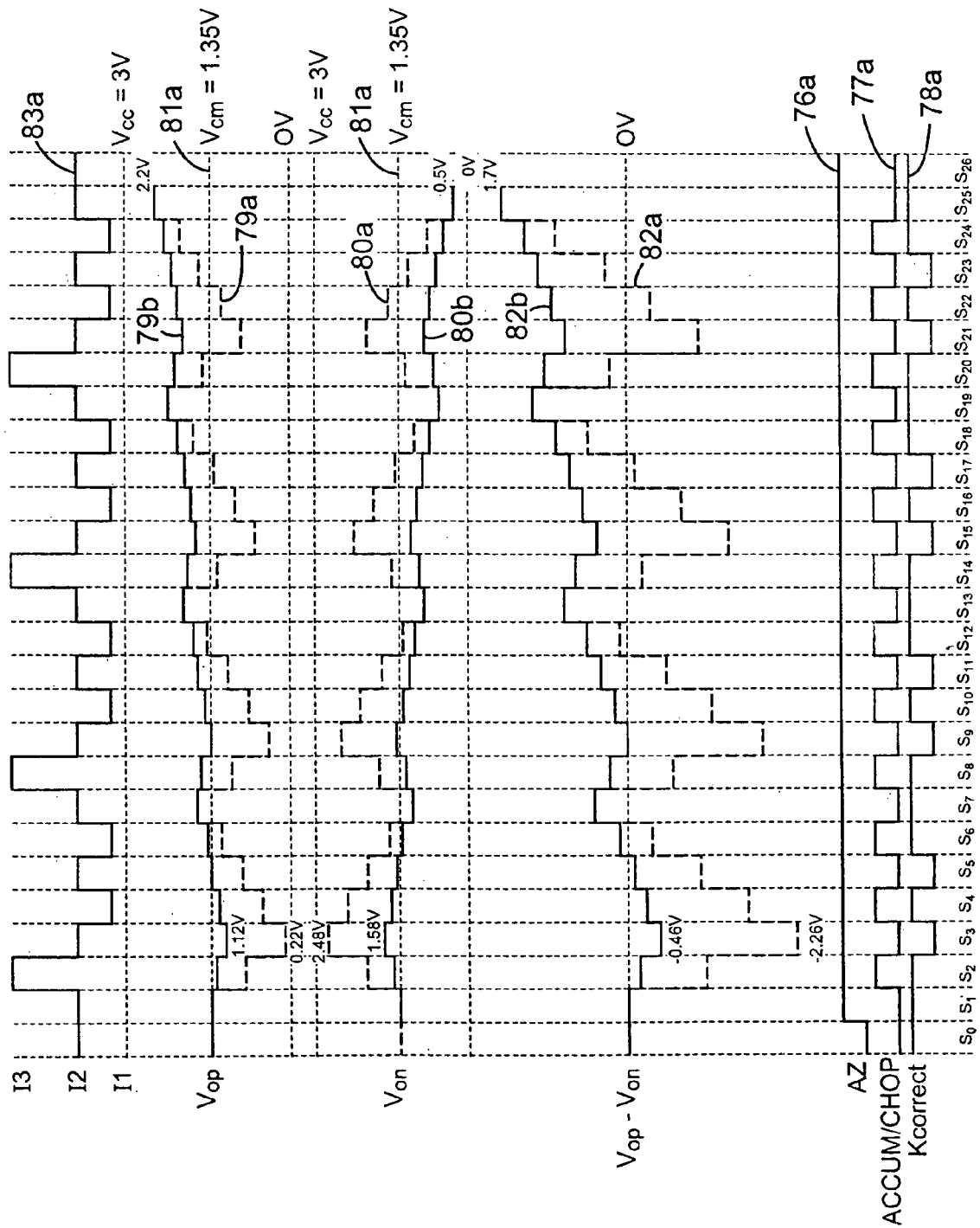
FIG. 12 illustrates waveforms outputted by the temperature sensing circuit during one complete temperature measuring cycle.

Referring now to FIG. 12, there is illustrated waveforms of the results of two simulation tests carried out on the temperature sensing circuit 1 of FIG. 1. In each test the supply voltage to the measuring circuit 8 and in turn to the op-amp 50 was 3 volts. The common mode voltage output of the op-amp was 1.35 volts. The temperature of the measuring transistor Q1 was 125° C. In the first test, current path series resistance was provided in the current path, and in the second test the current path series resistance was zero. In the simulation test in which current path series resistance was provided, the total current path series resistance was 1.5 kohms between the sensing nodes 20 and 21 through the measuring transistor Q1. The current path series resistance included the intrinsic base/emitter resistance of the measuring transistor Q1 and the line and track intrinsic resistances of the lines 10 and 11 and the tracks 17 and 18. The current path series resistance was divided equally between the base and emitter lines, and accordingly, the series resistance $R_e$ was equal to 750 ohms, and the series resistance $R_b$ was equal to 750 ohms.

In each of the simulation tests the currents $I_1$, $I_2$ and $I_3$ were forced into the emitter of the measuring transistor Q1 in the predetermined current sequence four times. This was carried out in twenty-six steps as illustrated in FIG. 12, namely, step S0 to step S25. The steps S0 to S7 correspond directly to the steps 0 to 7 already described with reference to FIG. 3. Step S8 corresponds to step 2 of the second predetermined current sequence, since step S7, which is the last step in the first predetermined current sequence, corresponds to the first step of the second predetermined current sequence. Accordingly, steps S8 to S13 correspond to the second predetermined current sequence, steps S14 to S19 correspond to the third predetermined current sequence, and steps S20 to S25 correspond to the fourth and last predetermined current sequence.

Waveform 83a represents the application of the currents $I_1$, $I_2$ and $I_3$ to the measuring transistor Q1, waveforms 76a, 77a and 78a represent the AZ signal, the ACCUM/CHOP signal, and the Kcorrect signal, respectively. The waveform 80a, which is the waveform illustrated by broken lines, represents the negative output voltage $V_{on}$ on the negative output of the op-amp 50 when the current path series resistance was 1.5 kohms. The waveform 79a, which is illustrated by the broken lines, represents the positive output voltage $V_{op}$ on the positive output of the op-amp 50 when the current path series resistance is 1.5 kohms. The waveform 82a illustrated in broken lines represents the differential output voltage $V_{op}$-$V_{on}$ of the op-amp 50. The waveform 81a represents the common mode output voltage of 1.35 volts of the op-amp 50. The waveforms 80b, 79b and 82b, which are illustrated in full lines, represent the negative output voltage $V_{on}$, the positive output voltage $V_{op}$ and the differential voltage output $V_{op}$-$V_{on}$ of the op-amp 50, respectively, when the current path series resistance is 0 ohms.

As can be seen, while the current path series resistance has an effect on the three voltage outputs, namely, $V_{op}$, $V_{on}$ and $V_{op}-V_{on}$ of the op-amp 50 during the integration of the voltage differences sensed at the sensing nodes 20 and 21 during application of the excitation currents in each of the predetermined current sequence, at the end of each predetermined current sequence, the positive output voltages $V_{op}$ of the op-amp 50 in each simulation test coincide, as do the negative output voltages $V_{on}$, and as do the differential output voltages $V_{op}-V_{on}$. Thus, while the current path series resistance causes an offset in the respective output voltages $V_{op}$, $V_{on}$ and $V_{op}-V_{on}$ of the op-amp 50 during the integration steps, at the end of each predetermined current sequence there is no offset voltage resulting from the current path series resistance. Thus, the current path series resistance has no effect on the output voltages from the op-amp at the end of the application of the excitation currents to the measuring transistor Q1 at the end of each predetermined current sequence.

Additionally, as can be seen from the waveforms 79a, 80a and 82a, the voltage offsets caused by the current path series resistance during integration of the voltage differences sensed at the sensing nodes 20 and 21 during the application of the excitation currents in the predetermined current sequence over the entire measuring cycle of four predetermined current sequences remains well within the headroom of the op-amp 50.

Figure 13:
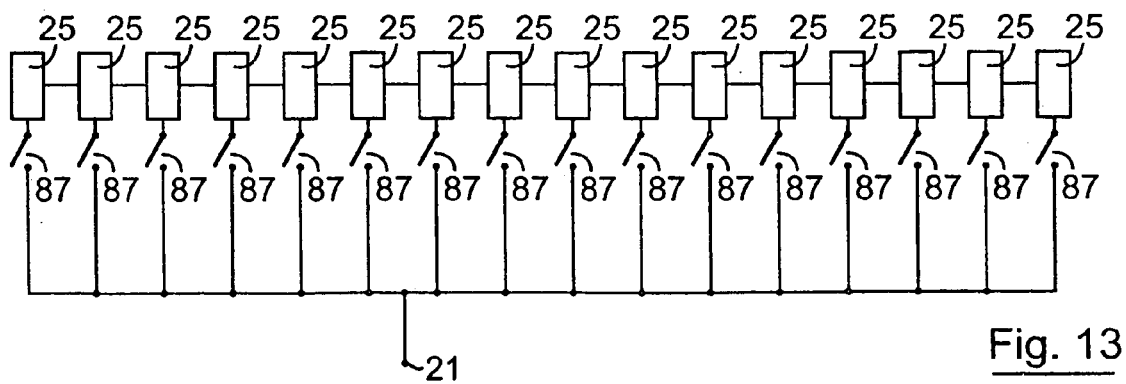
FIG. 13 is a diagrammatic representation of another detail of the temperature sensing circuit of FIG. 1.

Referring now to FIG. 13, the current source circuit 6 will now be described. As mentioned above, the current source circuit 6 comprises sixteen identical constant current sources 25 each producing a unit current which are implemented in the form of a current mirror circuit. The current from each current source 25 are switched to the sensing node 21 by a corresponding CMOS switch 87. The switches 87 of the respective current sources 25 are independently operable under the control of the timing control circuit 33. Accordingly, when the excitation current $I_1$ is required, one of the switches 87 is operated in the closed circuit state for applying the excitation current from the corresponding current source 25 to the sensing node 21, and the other fifteen switches 87 are operated in the open circuit state, by appropriate signals from the timing control circuit 33. When the current $I_2$ is required, six of the switches 87 corresponding to six current sources 25 are operated in the closed circuit state and the rest of the switches 87 are operated in the open circuit state. When the current $I_3$ is required, all sixteen switches 87 are operated in the closed circuit state. However, the same switch or switches 87, as the case may be, are not operated in the closed circuit state each time the excitation currents $I_1$ and $I_2$ are required. The excitation currents $I_1$ and $I_2$ are provided by different current sources 25 each time the excitation currents $I_1$ and $I_2$ are required to be applied to the measuring transistor Q1. In other words, the excitation currents $I_1$ and $I_2$ are obtained by shuffling the current sources 25. This avoids overuse of any particular current source 25.

Figure 14:
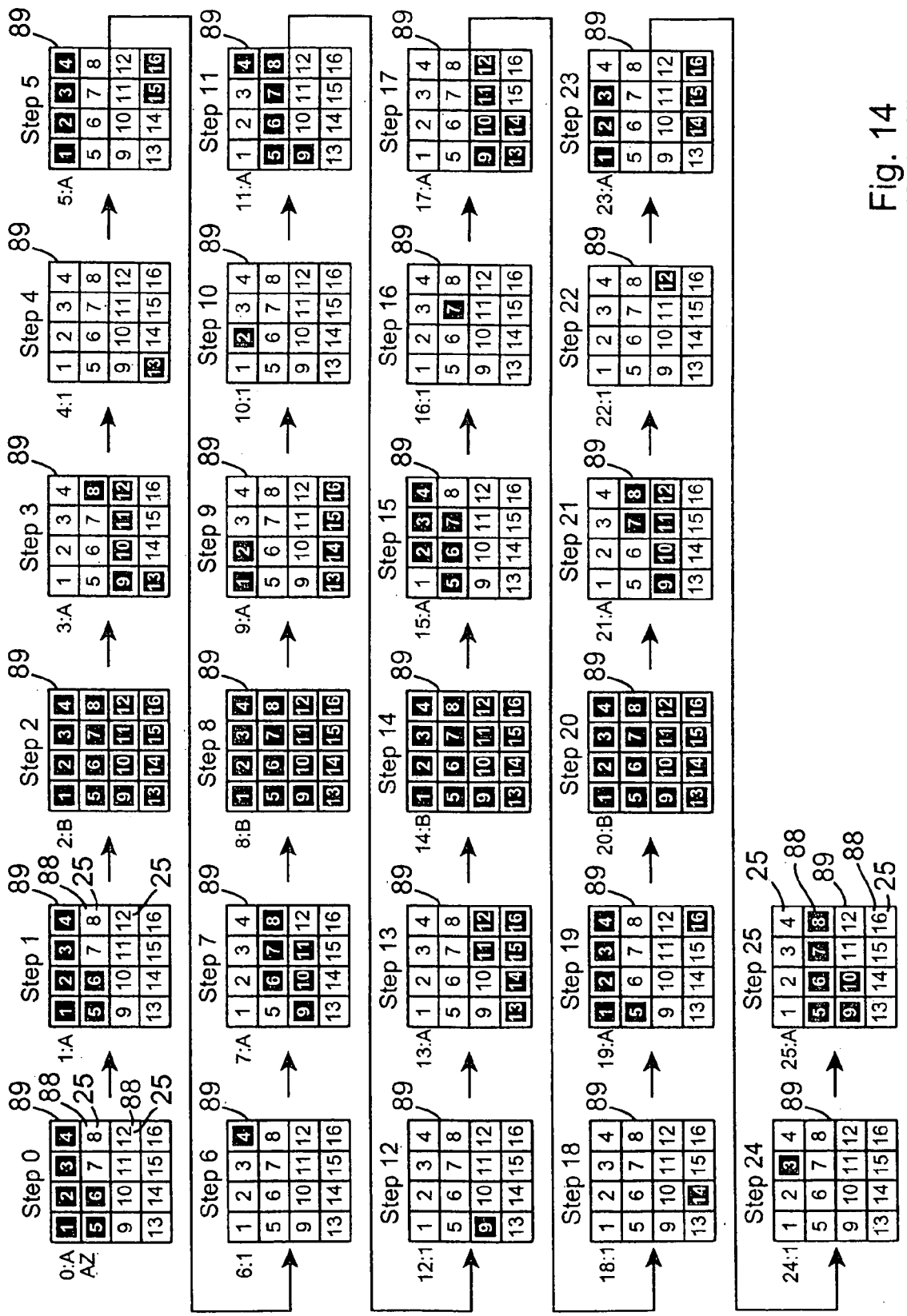
FIG. 14 is a diagrammatic representation of the operation of the detail of the temperature sensing circuit illustrated in FIG. 13.

A typical selection of the current sources 25 is illustrated diagrammatically in FIG. 14 during a full measuring cycle, where the excitation currents are applied to the measuring transistor Q1 sequentially four times in the predetermined current sequence. The sixteen current sources 25 are represented by respective squares 88 in the blocks 89 of FIG. 14, and are numbered within the squares 1 to 16. Each block 89 represents a selection of the currents from the current sources 25 in a corresponding one of the steps 0 to 25 of each measuring cycle. The current sources which are selected in each step of each measuring cycle are illustrated by blanking out the corresponding squares 88 which represent the selected current sources 25. Accordingly, for step 0 where the current $I_2$ is forced into the measuring transistor Q1 the current sources 25 represented by the squares 88 numbered 1 to 6 are selected. Similarly, in step 1 the same six current sources 25 remain selected. In step 2 where the current $I_3$ is forced into the measuring transistor Q1, all sixteen current sources 25 are selected. However, in step 3 where the current $I_2$ is again forced into the measuring transistor Q1, the current sources 25 represented by the squares numbered 8 to 13 are selected, and so on up to step 25.

Figure 15:
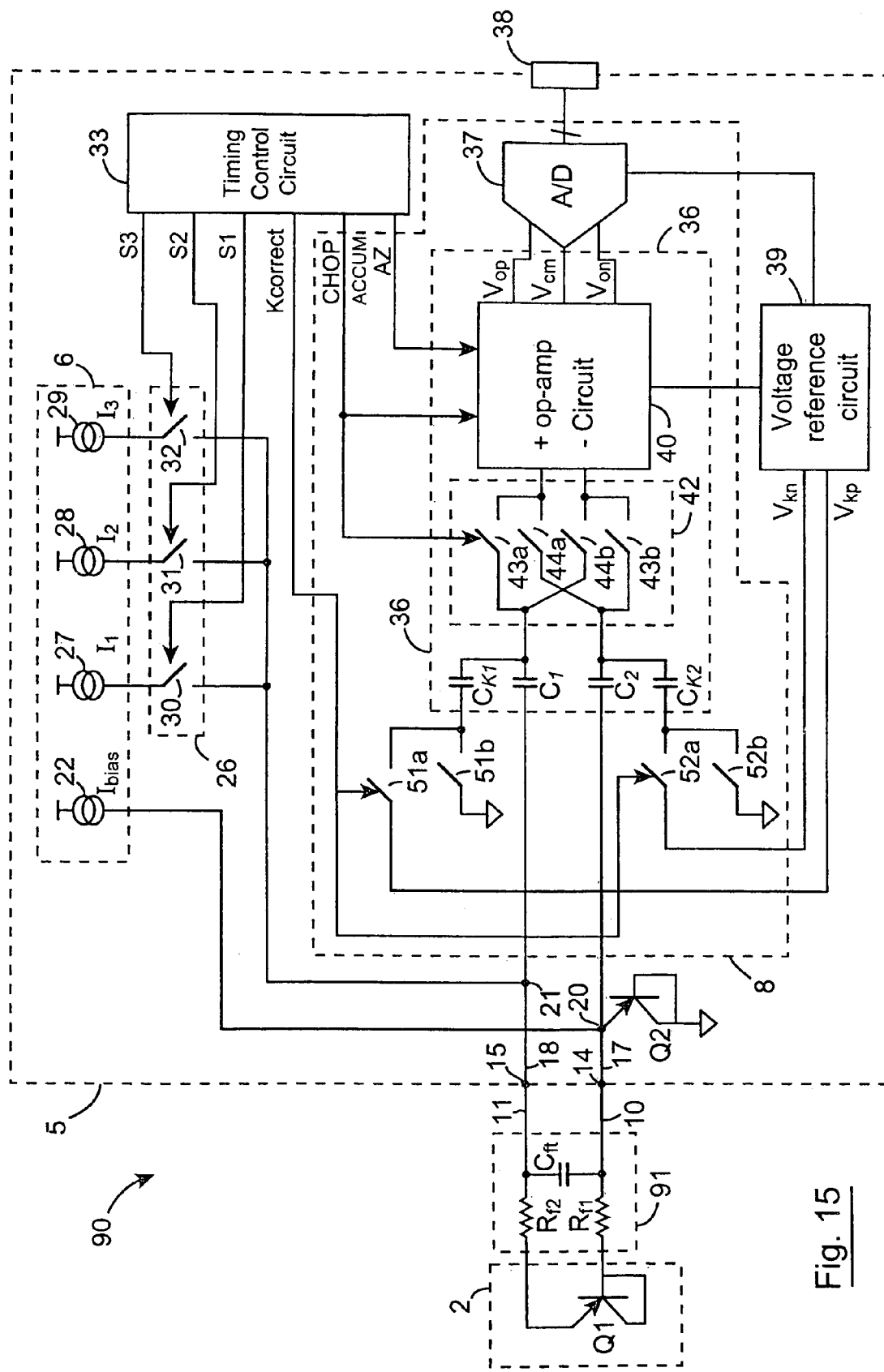
FIG. 15 is a block representation of a switched current temperature sensing circuit according to another embodiment of the invention.

Referring now to FIG. 15, there is illustrated a switched current temperature sensing circuit according to another embodiment of the invention, indicated generally by the reference numeral 90, also for measuring the temperature of a measuring transistor Q1, and for providing a voltage output indicative of the temperature of the measuring transistor Q1. The temperature sensing circuit 90 is substantially similar to the temperature sensing circuit 1 and similar components are identified by the same reference numerals. The differences between the temperature sensing circuit 90 and the temperature sensing circuit 1 are that firstly, the measuring transistor Q1 is a diode connected bipolar transistor, and secondly, an RC filter 91 is located in the base and emitter lines 10 and 11. The RC filter 91 comprises a resistor $R_{f1}$ in series in the base line 10 and a resistor $R_{f2}$ in series in the emitter line 11, and a capacitor $C_{ft}$ coupled across the base and emitter lines 10 and 11. Since any line series resistance in the current path through the measuring transistor Q1 between the sensing nodes 20 and 21 has no effect on the output of the measuring circuit 5, the values of the filter resistors $R_{f1}$ and $R_{f2}$ can be selected to be of any desired value, subject to any voltage offset due to the current path series resistance causing the integrated values of the voltage differences $\Delta V_{be}$ during integration thereof exceeding the voltage headroom of the op-amp. The capacitor $C_{ft}$ of the RC filter 91 has no effect on the output voltage of the op-amp 50.

The provision of the measuring transistor as a diode connected bipolar transistor has no effect on the output voltage of the op-amp 50 of the temperature sensing circuit 90, and the output voltage of the op-amp 50 is indicative of the temperature of the measuring transistor Q1, as is the output of the op-amp 50 indicative of the temperature of the measuring transistor Q1 in the temperature sensing circuit 1. Since the measuring transistor Q1 is diode connected, the current gain β of the measuring transistor Q1 in this embodiment of the invention will not appear in equations (10) to (16), inclusive, however, since as already described with reference to the temperature sensing circuit 1 described with reference to FIGS. 1 to 14 the resistance terms which include the current gain term β of the measuring transistor Q1 are eliminated, and thus have no effect on the output voltage of the op-amp 50 which is indicative of the temperature of the measuring transistor Q1. The computations for determining the temperature of the measuring transistor Q1 in the temperature sensing circuit 90 according to this embodiment of the invention is substantially similar to that already described with reference to the temperature sensing circuit 1. Accordingly, operation of the temperature sensing circuit 90 is likewise similar to that of the temperature sensing circuit 1, and in this embodiment of the invention the three excitation currents $I_1$, $I_2$ and $I_3$ are applied to the measuring transistor Q1 in the same predetermined current sequence, and additionally, the measuring transistor Q1 is subjected to the excitation currents being applied thereto in four consecutive predetermined current sequences, as already described with reference to the temperature sensing circuit 1.

In general, it is envisaged that where the temperature to be monitored is that of an integrated circuit, either remotely of the measuring circuit, or where the measuring circuit and the measuring transistor are formed in the same integrated circuit, for example, in a CMOS circuit, the measuring transistor will be provided in the integrated circuit as a substrate bipolar transistor. Where the measuring circuit and the measuring transistor are provided on the same integrated circuit, in general, the bipolar measuring transistor will be provided with its collector coupled to ground or to a low impedance point in the circuit. However, where the measuring transistor is located on a remote integrated circuit, in general, it is envisaged that the measuring transistor will be provided as a diode connected PNP substrate bipolar transistor, although it could be provided with its collector connected to ground or to a low impedance point in the circuit. On the other hand, where the temperature to be measured is not a temperature of an integrated circuit, in general, it is envisaged that the measuring transistor will be provided as a diode connected bipolar transistor, although, in certain cases, the measuring transistor may be provided as a bipolar transistor with its collector coupled to ground or to a suitable low impedance point.

While specific values and ratios of the excitation currents $I_1$, $I_2$ and $I_3$ have been described, other excitation current values and ratios could be used without departing from the scope of the invention, and these will be readily apparent to those skilled in the art. Additionally, the excitation currents may be applied to the measuring transistor in predetermined current sequences which are different to the predetermined current sequence already described. However, in order to minimise the cumulative effect of the integration of the differences of the successively sensed voltages on the sensing nodes, it is desirable that the currents of maximum and minimum value should not be applied sequentially to the measuring transistor. Additionally, it is desirable that the predetermined current sequence should be selected so that the first of the excitation currents to be applied to the measuring transistor in a measuring cycle is a current closest to the average value between the maximum and minimum values. Additionally, it is desirable that the predetermined current sequence be selected so that each excitation current should be followed by the excitation current of closest value to that current when the value of the currents being applied to the measuring transistor is increasing, and also when the value of the currents being applied to the measuring transistor is decreasing, provided of course that the difference between the respective currents is sufficient to provide a detectable difference on the sensing nodes, allowing for noise in the temperature sensing circuit.

Similarly, the number of times the excitation currents are applied to the measuring transistor in a current sequence may be varied. However, in order to eliminate the voltage offset of the op-amp it is important that the signals through the op-amp are chopped an even number of times. Additionally, by avoiding the sequential application of the excitation currents of maximum and minimum values to the measuring transistor, any voltage offset due to the current path series resistance is also maintained at a low level. Thereby, the possibility of exceeding the headroom of the op-amp is minimised during integration of the voltage differences $\Delta V_{be}$.

Needless to say, while the predetermined current sequence has been described as being applied sequentially four times in a measuring cycle, the predetermined current sequence may be applied any number of times in a measuring cycle, subject to the headroom of the op-amp, and other parts of the measuring circuit, and that at the end of the measuring cycle the voltage offset in the op-amp and the effect of the current path series resistance is eliminated.

Further, it will be appreciated that more than three excitation currents of different values may be used, however, it is essential that at least three excitation currents of different values should be provided.

It will also be appreciated that while specific ratios and values of components, for example, capacitors, have been described, components of any other values and ratios could be used, and this will be readily apparent to those skilled in the art.

It will also be appreciated that while the op-amp has been described as being provided with a chopping feature, while this is advantageous, in that it eliminates the op-amp voltage offset, in certain cases, chopping of the signals through the op-amp may not be carried out.

It will of course be appreciated that measuring transistors other than those described may be used in conjunction with the temperature sensing circuit. For example, instead of a diode connected bipolar transistor, the bipolar transistor described in the embodiment of the measuring circuit described with reference to FIG. 15 may be provided with its collector coupled to ground or to a suitable low impedance point in the circuit. Additionally, the substrate bipolar transistor of the measuring circuit described with reference to FIGS. 1 to 14 instead of being provided with its collector coupled to ground, could be provided as a diode connected bipolar transistor. Needless to say, any other suitable PN junctions may be used. However, it is important that whatever PN junction is used, it should be selected such that the current gain is substantially constant within the operational range of the collector current. In other words, the variation in the current gain over the operational collector current range of the transistor should be minimised.

While the measuring transistor and the biasing transistor have been described as being PNP junction transistors, NPN junction transistors could be used. Additionally, while the measuring transistor has been described as being located remotely of the measuring circuit, the measuring transistor could be formed integrally with the measuring circuit. It will also be appreciated that while the measuring transistor has been biased at a bias voltage of 0.65 volts, the measuring transistor may be biased at any suitable voltage, and indeed, in certain cases the sensing node 21 may be maintained at 0 volts, in which case the biasing transistor Q2 would be omitted.

What is claimed is:

1. A method for determining temperature of a device which exhibits an exponential relationship between temperature and a voltage in response to an excitation current, comprising the acts of:

sequentially applying at least three excitation currents of different values to the device along a current path in a predetermined current sequence for sequentially exciting the device for developing successive voltage values across the device in response to the excitation currents;

sensing successive voltages developed across two sensing nodes in the current path on opposite sides of the device in response to the excitation currents; and combining the differences of the successive sensed voltages for determining a voltage indicative of the temperature of the device;

wherein, the predetermined current sequence is selected so that as the differences of the successive sensed voltages developed across the two sensing nodes in the current path are being combined, the cumulative effect, in the sensed voltages, of voltage components resulting from series resistance in the current path between the two sensing nodes through the device is minimised, and the number of times the device is subjected to excitation by the excitation currents during the predetermined current sequence is selected so that the effect of the voltage components resulting from the series resistance in the current path between the two sensing nodes in the determined voltage indicative of the temperature of the device is substantially eliminated.

2. A method as claimed in claim 1 in which the predetermined current sequence is selected so that each excitation current with which the device is excited is different to the excitation current with which the device had been previously excited.

3. A method as claimed in claim 1 in which the predetermined current sequence is selected so that each excitation current with which the device is excited is of value closest to the value of the excitation current with which the device had been previously excited when the values of the currents in the predetermined sequence are being applied to the device in increasing order and decreasing order.

4. A method as claimed in claim 1 in which the predetermined current sequence is selected so that the device is not sequentially excited by the excitation currents of highest and lowest values.

5. A method as claimed in claim 1 in which the predetermined current sequence is selected so that the first excitation current of the predetermined current sequence is the excitation current which is closest to the average value of the excitation current of highest value and the excitation current of lowest value.

6. A method as claimed in claim 1 in which the predetermined current sequence is selected so that the second excitation of the predetermined current sequence is the excitation current of highest value.

7. A method as claimed in claim 1 in which the predetermined current sequence comprises excitation currents of three different values, namely, one excitation current of a high current value, one excitation current of a low current value, and one excitation current of an intermediate value, intermediate the high and the low current values.

8. A method as claimed in claim 1 in which the differences of the successive sensed voltages developed across the two sensing nodes are combined during excitation of the device with the excitation currents in the predetermined current sequence, so that the determined voltage indicative of the temperature of the device is derived from the difference of at least one difference of the sensed voltages resulting from excitation of the device by two of the excitation currents, and at least one difference of the sensed voltages resulting from excitation of the device with one of the said two excitation currents and another one of the at least three excitation currents.

9. A method as claimed in claim 8 in which the differences of the successive sensed voltages developed across the two sensing nodes are combined during excitation of the device with the excitation currents in the predetermined current sequence, so that the determined voltage indicative of the temperature of the device is derived from a plurality of differences of the sensed voltages resulting from excitation of the device by two of the excitation currents, and a plurality of differences of the sensed voltages resulting from excitation of the device with one of the said two excitation currents and another one of the at least three excitation currents.

10. A method as claimed in claim 1 in which the predetermined current sequence is selected so that the combined value of differences of the successive sensed voltages developed across the two sensing nodes resulting from excitation of the device by the currents in the predetermined current sequence initially progressively decreases to a minimum value, and then progressively increases.

11. A method as claimed in claim 1 in which the device is subjected to an even number of excitations by the excitation currents in the predetermined current sequence.

12. A method as claimed in claim 1 in which the device is subjected to the excitation currents for a plurality of the predetermined current sequences sequentially for compounding the voltage indicative of the temperature of the device determined during each predetermined current sequence in the next predetermined current sequence.

13. A method as claimed in claim 1 in which a Kelvin offset correction voltage is combined with the differences of the successive sensed voltages developed across the two sensing nodes, as the differences of the successive sensed voltages are being combined, for altering the voltage indicative of temperature of the device, so that a value of the voltage indicative of the temperature of the device of zero volts corresponds substantially to the lowest theoretical temperature of the temperature range within which the device is to be operational.

14. A method as claimed in claim 13 in which the Kelvin offset correction voltage is provided as a coarse Kelvin correcting voltage and a fine Kelvin correcting voltage.

15. A method as claimed in claim 14 in which the values of the coarse and fine Kelvin correcting voltages are selected so that the coarse and fine Kelvin correcting voltages are combined with the voltage differences more than once as the device is subjected to the excitation currents during the predetermined current sequence.

16. A method as claimed in claim 15 in which the number of times the coarse and fine Kelvin correcting voltages are combined with the voltage differences as the device is subjected to the excitation currents during each predetermined current sequence is less than the number of voltage difference combinations during each predetermined current sequence.

17. A method as claimed in claim 1 in which the differences of the successive sensed voltages developed across the two sensing nodes resulting from excitation of the device by the excitation currents in the predetermined current sequence are combined by integration.

18. A method as claimed in claim 17 in which the integrating circuit in which the differences of the successive sensed voltages developed across the two sensing nodes are integrated is a switched capacitor integrating circuit comprising a differential operational amplifier, and an offset voltage of the operational amplifier is compensated for by chopping its input pair in phase with the integration of the differences of the successive sensed voltages developed across the two sensing nodes, as the differences are being integrated.

19. A method as claimed in claim 1 in which the device which exhibits an exponential relationship between temperature and voltage in response to an excitation current is a PN junction.

20. A method as claimed in claim 19 in which the PN junction is formed by a bipolar transistor having a current gain which is substantially constant within its operating range of collector currents.

21. A method as claimed in claim 20 in which the PN junction is formed by the base/emitter junction of the bipolar transistor, and the excitation currents in the predetermined current sequence are applied to the emitter of the transistor for developing the successive voltage values as base/emitter voltages of the transistor.

22. A method as claimed in claim 20 in which the bipolar transistor is a substrate bipolar transistor.

23. A method as claimed in claim 20 in which the bipolar transistor is diode connected.

24. A method as claimed in claim 20 in which the collector of the bipolar transistor is connected to a fixed voltage.

25. A method as claimed in claim 1 in which the successive voltage values developed across the device in response to the excitation currents being applied in the predetermined current sequence, are filtered by placing a resistive element of a filter in the current path in series with the device between the device and at least one of the sensing nodes.

26. A method as claimed in claim 1 in which the excitation currents of respective different values are derived from a plurality of identical current sources by selecting the appropriate number of current sources to provide the respective excitation currents.

27. A method as claimed in claim 22 in which the excitation currents of values less than the excitation current of highest value are derived from the current sources by selecting a different combination of current sources each time each one of the excitation currents of values less than the excitation current of highest value is to be derived.

28. A measuring circuit for determining temperature of a device which exhibits an exponential relationship between temperature and voltage in response to an excitation current, the circuit comprising:
a current supply circuit for supplying at least three excitation currents of different values for exciting the device,
a first switch circuit for selectively and sequentially applying the excitation currents to the device along a current path for sequentially exciting the device for developing successive voltage values across the device in response to the excitation currents,
an integrating circuit coupled to two sensing nodes in the current path on opposite sides of the device for sensing successive voltages developed across the sensing nodes in response to the excitation currents, and for combining the differences of the successive sensed voltages for determining a voltage indicative of the temperature of the device,
a control circuit for controlling the first switch circuit for applying the excitation currents to the device in a predetermined current sequence so that the successive sensed voltages developed across the two sensing nodes in response to the excitation currents in the predetermined current sequence is such that as the differences of the successive sensed voltages are being combined in the integrating circuit, the cumulative effect, in the sensed voltages, of voltage components resulting from series resistance in the current path between the two sensing nodes through the device is minimised, and
controlling the number of times the excitation currents are applied to the device in the predetermined current sequence so that the effect of the voltage components resulting from the series resistance in the current path between the two sensing nodes in the determined voltage indicative of the temperature of the device is substantially eliminated.

29. A measuring circuit as claimed in claim 28 in which the control circuit controls the first switch circuit for applying the excitation currents to the device in the predetermined current sequence so that each excitation current with which the device is excited is different to the excitation current with which the device had been previously excited.

30. A measuring circuit as claimed in claim 28 in which the control circuit controls the first switch circuit for applying the excitation currents to the device in the predetermined current sequence so that each excitation current with which the device is excited is of value closest to the value of the excitation current with which the device had been previously excited when the values of the currents in the predetermined sequence are being applied to the device in increasing order and decreasing order.

31. A measuring circuit as claimed in claim 28 in which the control circuit controls the first switch circuit for applying the excitation currents to the device in the predetermined current sequence, so that the device is not sequentially excited by the excitation currents of highest and lowest values.

32. A measuring circuit as claimed in claim 28 in which the control circuit controls the first switch circuit for applying the excitation currents to the device in the predetermined current sequence so that the excitation current with which the device is first excited in the predetermined current sequence is the excitation current which is closest to the average value of the excitation current of highest value and the excitation current of lowest value.

33. A measuring circuit as claimed in claim 28 in which the control circuit controls the first switch circuit for applying the excitation currents to the device in the predetermined current sequence so that the second excitation of the device is with the excitation current of highest value.

34. A measuring circuit as claimed in claim 28 in which the current supply circuit provides excitation currents of three different values for exciting the device in the predetermined current sequence, one of the excitation currents being of a high current value, one of the excitation currents being of a low current value, and one of the excitation currents being of an intermediate value, intermediate the high and the low current values.

35. A measuring circuit as claimed in claim 28 in which the integrating circuit combines the differences of the successive sensed voltages developed across the two sensing nodes during excitation of the device with the excitation currents in the predetermined current sequence so that the determined voltage indicative of the temperature of the device is derived from the difference of at least one difference of the sensed voltages resulting from excitation of the device by two of the excitation currents, and at least one difference of the sensed voltages resulting from excitation of the device with one of the said two excitation currents and another of the at least three excitation currents.

36. A measuring circuit as claimed in claim 35 in which the integrating circuit combines the differences of the successive sensed voltages developed across the two sensing nodes during excitation of the device with the excitation currents in the predetermined current sequence so that the determined voltage indicative of the temperature of the device is derived from a plurality of differences of the sensed voltages resulting from excitation of the device by two of the excitation currents, and a plurality of differences of the sensed voltages resulting from excitation of the device with one of the said two excitation currents and another of the at least three excitation currents.

37. A measuring circuit as claimed in claim 28 in which the control circuit controls the first switch circuit for applying the excitation currents to the device in the predetermined current sequence so that the device is excited an even number of times.

38. A measuring circuit as claimed in claim 28 in which the control circuit controls the first switch circuit for applying the excitation currents to the device in the predetermined current sequence for a plurality of predetermined current sequences sequentially, and the integrating circuit combines the differences of the successive sensed voltages during excitation of the device with the excitation currents in the plurality of sequential predetermined current sequences for compounding the voltage indicative of the temperature of the device determined during each predetermined current sequence in the next predetermined current sequence.

39. A measuring circuit as claimed in claim 28 in which the integrating circuit combines a Kelvin offset correction voltage with the differences of the sensed voltages developed across the two sensing nodes for altering the voltage indicative of temperature of the device, so that a value of the voltage indicative of the temperature of the device of zero volts corresponds substantially to the lowest theoretical temperature of the temperature range within which the device is to be operational.

40. A measuring circuit as claimed in claim 28 in which the integrating circuit comprises a switched capacitor integrating circuit.

41. A measuring circuit as claimed in claim 40 in which the switched capacitor integrating circuit comprises a differential operational amplifier, and a pair of input capacitors, one of which is coupled to one of the sensing nodes, and the other of which is coupled to the other of the sensing nodes, the input capacitors being successively charged by the successive sensed voltages on the respective sensing nodes, a second switch circuit being provided for selectively applying the charges on the input capacitors to respective non-inverting and inverting inputs of the operational amplifier, the second switch circuit being operated under the control of the control circuit for applying the charges on the respective input capacitors to the non-inverting and inverting inputs of the operational amplifier for integration of the differences of successive charges on the respective input capacitors resulting from the excitation currents being applied to the device in the predetermined current sequence so that a differential voltage outputted by the operational amplifier after integration of the differences of the successive charges on the respective input capacitors, resulting from excitation of the device by the excitation currents in the predetermined current sequence is the voltage indicative of the temperature of the device.

42. A measuring circuit as claimed in claim 41 in which the second switch circuit is operated under the control of the control circuit so that the successive charges on the respective input capacitors are alternately switched to the non-inverting and inverting inputs of the operational amplifier.

43. A measuring circuit as claimed in claim 41 in which the signals on the non-inverting and inverting inputs of the operational amplifier are chopped in phase with the integration of the differences of the successive charges on the respective input capacitors for eliminating the effect of an offset voltage of the operational amplifier on the output voltage indicative of temperature of the device.

44. A measuring circuit as claimed in claim 41 in which the first switch circuit is operated under the control of the control circuit for applying the excitation currents to the device in the predetermined current sequence, and the second switch circuit is operated under the control of the control circuit for integration of the differences in the successive charges on the respective input capacitors, so that the differential output voltage of the operational amplifier initially progressively decreases to a minimum value and then progressively increases.

45. A measuring circuit as claimed in claim 41 in which a pair of Kelvin offset correction capacitors are provided for charging by respective corresponding coarse and fine Kelvin correcting voltages for altering the voltage indicative of temperature of the device, so that a value of the voltage indicative of the temperature of the device of zero volts corresponds substantially to the lowest theoretical temperature of the temperature range within which the device is to be operational.

46. A measuring circuit as claimed in claim 41 in which a pair of feedback capacitors are coupled to the differential operational amplifier, one of the feedback capacitors coupling the positive output of the operational amplifier with the non-inverting input thereof, and the other feedback capacitor coupling the negative output of the operational amplifier with the inverting input thereof.

47. A measuring circuit as claimed in claim 46 in which a third switch circuit is provided for selectively discharging the feedback capacitors and for coupling the feedback capacitors between the corresponding one of the negative and positive outputs of the operational amplifier and a common mode output thereof for auto-zeroing the integrating circuit.

48. A measuring circuit as claimed in claim 28 in which the current supply circuit comprises a plurality of identical current sources, and the first switch circuit is operated under the control of the control circuit for selecting the appropriate number of the current sources to provide the respective excitation currents.

49. A measuring circuit as claimed in claim 48 in which the first switch circuit is operated under the control of the control circuit for selecting a different combination of current sources each time each one of the excitation currents of values less than the excitation current of highest value is to be selected within the predetermined current sequence.

50. A measuring circuit as claimed in claim 28 in which a filter is provided for filtering the successive voltage values developed across the device in response to the excitation currents being applied to the device in the predetermined sequence, the filter comprising at least one resistive element located in the current path between the device and at least one of the sensing nodes.

51. A measuring circuit as claimed in claim 50 in which the filter comprises a pair of resistive elements located in the current path on respective opposite sides of the device between the device and the respective sensing nodes.

52. A measuring circuit as claimed in claim 50 in which the filter is an RC filter, and a capacitive element is provided for coupling the current path on one side of the device extending between the device and one of the sensing nodes, with the current path on the other side of the device extending between the device and the other of the sensing nodes.

53. A measuring circuit as claimed in claim 28 in which the circuit comprises the device which exhibits an exponential relationship between temperature and voltage in response to an excitation current.

54. A measuring circuit as claimed in claim 28 in which the device which exhibits an exponential relationship between temperature and voltage in response to an excitation current is a PN junction.

55. A measuring circuit as claimed in claim 54 in which the PN junction is formed by a bipolar transistor having a current gain which is substantially constant within its operating range of collector currents.

56. A measuring circuit as claimed in claim 55 in which the PN junction is formed by the base/emitter junction of the bipolar transistor, and the excitation currents in the predetermined current sequence are applied to the emitter of the transistor for developing the successive voltage values as base/emitter voltages of the transistor.

57. A measuring circuit as claimed in claim 55 in which the bipolar transistor is a substrate bipolar transistor.

58. A measuring circuit as claimed in claim 55 in which the bipolar transistor is diode connected.

59. A measuring circuit as claimed in claim 55 in which the collector of the bipolar transistor is connected to a fixed voltage.

* * * * *